(12) United States Patent
Chen et al.

(10) Patent No.: US 9,673,450 B2
(45) Date of Patent: Jun. 6, 2017

(54) LITHIUM ION BATTERY

(75) Inventors: Xudong Chen, Hockessin, DE (US);
Jun J Liu, Wilmington, DE (US);
Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 112 days.

(21) Appl. No.: 14/241,898

(22) PCT Filed: Aug. 31, 2012

(86) PCT No.: PCT/US2012/053439
§ 371 (c)(1),
(2), (4) Date: Feb. 28, 2014

(87) PCT Pub. No.: WO2013/033595
PCT Pub. Date: Mar. 7, 2013

(65) Prior Publication Data
US 2014/0248529 A1 Sep. 4, 2014

Related U.S. Application Data

(60) Provisional application No. 61/530,545, filed on Sep. 2, 2011, provisional application No. 61/654,184, filed on Jun. 1, 2012.

(51) Int. Cl.
| | | |
|---|---|---|
| *H01M 4/13* | (2010.01) |
| *H01M 4/505* | (2010.01) |
| *C01G 53/00* | (2006.01) |
| *H01M 4/485* | (2010.01) |
| *H01M 10/0525* | (2010.01) |
| *H01M 10/0567* | (2010.01) |
| *H01M 10/0569* | (2010.01) |
| *H01M 4/02* | (2006.01) |

(52) U.S. Cl.
CPC ............ *H01M 4/505* (2013.01); *C01G 53/54* (2013.01); *H01M 4/485* (2013.01); *H01M 10/0525* (2013.01); *H01M 10/0567* (2013.01); *H01M 10/0569* (2013.01); *H01M 2004/028* (2013.01)

(58) Field of Classification Search
CPC .................................................... H01M 10/04
See application file for complete search history.

(56) References Cited

U.S. PATENT DOCUMENTS

| | | |
|---|---|---|
| 2,824,141 A | 2/1958 | Zisman et al. |
| 3,006,964 A | 10/1961 | Oesterling |

(Continued)

FOREIGN PATENT DOCUMENTS

| | | |
|---|---|---|
| CN | 101617432 A1 | 12/2009 |
| CN | 102790236 A1 | 11/2012 |

(Continued)

OTHER PUBLICATIONS

US 8,372,547, 02/2013, Koh et al. (withdrawn)

(Continued)

*Primary Examiner* — Jacob Marks

(57) ABSTRACT

A lithium ion battery that has a spinel cathode and a nonaqueous electrolyte comprising a fluorinated acyclic carboxylic acid ester and/or a fluorinated acyclic carbonate solvent is described. The lithium ion battery operates at a high voltage (i.e. up to about 5 V) and has improved cycling performance at high temperature.

27 Claims, 13 Drawing Sheets

(56) References Cited

U.S. PATENT DOCUMENTS

| | | | |
|---|---|---|---|
| 5,273,840 A | 12/1993 | Dominey | |
| 5,352,548 A | 10/1994 | Fujimoto et al. | |
| 5,446,134 A | 8/1995 | Armand et al. | |
| 5,534,634 A | 7/1996 | Appel et al. | |
| 5,561,232 A | 10/1996 | Hao et al. | |
| 5,659,062 A | 8/1997 | Yokoyama et al. | |
| 5,738,957 A | 4/1998 | Amine et al. | |
| 5,847,156 A | 12/1998 | Eldin et al. | |
| 5,847,188 A | 12/1998 | Yokoyama et al. | |
| 5,925,283 A | 7/1999 | Taniuchi et al. | |
| 5,962,166 A | 10/1999 | Ein-Eli et al. | |
| 6,168,878 B1 | 1/2001 | Fauteux et al. | |
| 6,337,158 B1 | 1/2002 | Nakajima et al. | |
| 6,420,069 B2 | 7/2002 | Amine et al. | |
| 6,465,135 B1 | 10/2002 | Nishimura et al. | |
| 6,495,293 B1 | 12/2002 | Arai et al. | |
| 6,506,516 B1 | 1/2003 | Wietelmann et al. | |
| 6,506,524 B1 | 1/2003 | McMillan et al. | |
| 6,534,220 B2 | 3/2003 | Garbe | |
| 6,680,145 B2 | 1/2004 | Obrovac et al. | |
| 6,723,473 B1 | 4/2004 | Oura et al. | |
| 6,878,492 B2 | 4/2005 | Takeuchi et al. | |
| 6,958,198 B2 | 10/2005 | Iwamoto et al. | |
| 6,964,828 B2 | 11/2005 | Lu et al. | |
| 7,026,070 B2 | 4/2006 | Noguchi et al. | |
| 7,078,128 B2 | 7/2006 | Lu et al. | |
| 7,229,718 B2 | 6/2007 | Yamaguchi et al. | |
| 7,303,840 B2 | 12/2007 | Thackeray et al. | |
| 7,312,001 B2 | 12/2007 | Kim et al. | |
| 7,381,496 B2 | 6/2008 | Onnerud et al. | |
| 7,416,813 B2 | 8/2008 | Fujihara et al. | |
| 7,468,223 B2 | 12/2008 | Thackeray et al. | |
| 7,491,471 B2 | 2/2009 | Yamaguchi et al. | |
| 7,541,114 B2 | 6/2009 | Ohzuku et al. | |
| 7,635,536 B2 | 12/2009 | Johnson et al. | |
| 7,718,319 B2 | 5/2010 | Manthiram et al. | |
| 7,754,389 B2 | 7/2010 | Yamaguchi et al. | |
| 7,790,308 B2 | 9/2010 | Johnson et al. | |
| 7,981,544 B2 | 7/2011 | Morishima | |
| 8,092,942 B1 | 1/2012 | Chen et al. | |
| 8,097,368 B2 | 1/2012 | Chiga et al. | |
| 8,158,285 B2 | 4/2012 | Im et al. | |
| 8,178,246 B2 | 5/2012 | Shima | |
| 8,216,726 B2 | 7/2012 | Wakita et al. | |
| 8,277,973 B2 | 10/2012 | Kawashima | |
| 8,288,039 B2 | 10/2012 | Im et al. | |
| 8,367,254 B2 | 2/2013 | Im et al. | |
| 8,372,549 B2 | 2/2013 | Im et al. | |
| 8,389,160 B2 | 3/2013 | Venkatachalam et al. | |
| 8,394,534 B2 | 3/2013 | Lopez et al. | |
| 8,415,056 B2 | 4/2013 | Koh et al. | |
| 8,435,680 B2 | 5/2013 | Park et al. | |
| 8,455,143 B2 | 6/2013 | Lee et al. | |
| 8,518,525 B2 | 8/2013 | Dennes et al. | |
| 8,530,099 B2 | 9/2013 | Chen et al. | |
| 8,535,832 B2 | 9/2013 | Karthikeyan et al. | |
| 8,546,024 B2 | 10/2013 | Jeon et al. | |
| 8,557,447 B2 | 10/2013 | Lee | |
| 8,586,245 B2 | 11/2013 | Yamaguchi et al. | |
| 8,668,838 B2 | 3/2014 | Takahashi et al. | |
| 8,673,506 B2 | 3/2014 | Jeon et al. | |
| 8,715,852 B2 | 5/2014 | Kim et al. | |
| 8,715,865 B2 | 5/2014 | Xu et al. | |
| 8,735,005 B2 | 5/2014 | Holstein et al. | |
| 8,795,903 B2 | 8/2014 | Smart et al. | |
| 8,871,384 B2 | 10/2014 | Koh et al. | |
| 8,877,389 B2 | 11/2014 | Koh et al. | |
| 8,945,781 B2 | 2/2015 | Chiga et al. | |
| 8,946,452 B2 | 2/2015 | Dietz et al. | |
| 9,093,718 B2 | 7/2015 | Dietz et al. | |
| 9,105,943 B2 | 8/2015 | Jeon et al. | |
| 9,246,191 B2 | 1/2016 | Jeon et al. | |
| 2003/0180618 A1 | 9/2003 | Inoue et al. | |
| 2003/0190529 A1 | 10/2003 | Kim et al. | |
| 2004/0157133 A1 | 8/2004 | Kim et al. | |
| 2005/0196670 A1 | 9/2005 | Yamaguchi et al. | |
| 2006/0051671 A1 | 3/2006 | Thackeray et al. | |
| 2006/0115739 A1 | 6/2006 | Yamaguchi et al. | |
| 2006/0147808 A1 | 7/2006 | Xiao et al. | |
| 2006/0154149 A1 | 7/2006 | Arai et al. | |
| 2006/0216612 A1 | 9/2006 | Jambunathan et al. | |
| 2007/0042267 A1 | 2/2007 | Kim et al. | |
| 2007/0148540 A1 | 6/2007 | Chiga et al. | |
| 2007/0178379 A1 | 8/2007 | Tamura et al. | |
| 2007/0190412 A1 | 8/2007 | Chiga et al. | |
| 2007/0224504 A1 | 9/2007 | Kita et al. | |
| 2007/0287071 A1 | 12/2007 | Chiga et al. | |
| 2008/0102375 A1* | 5/2008 | Shima | H01M 10/0525 429/331 |
| 2008/0131772 A1 | 6/2008 | Jambunathan et al. | |
| 2008/0145763 A1 | 6/2008 | Koh et al. | |
| 2008/0292971 A1 | 11/2008 | Iharu et al. | |
| 2009/0142663 A1 | 6/2009 | Takeuchi et al. | |
| 2009/0253044 A1 | 10/2009 | Nogi et al. | |
| 2009/0253048 A1 | 10/2009 | Shima | |
| 2010/0035162 A1* | 2/2010 | Chiga | H01M 10/052 429/343 |
| 2010/0047695 A1 | 2/2010 | Smart et al. | |
| 2010/0062344 A1 | 3/2010 | Koh et al. | |
| 2010/0081062 A1 | 4/2010 | Chiga et al. | |
| 2010/0108934 A1 | 5/2010 | Flynn et al. | |
| 2010/0119956 A1 | 5/2010 | Tokuda et al. | |
| 2010/0183926 A1 | 7/2010 | Kim et al. | |
| 2010/0190055 A1* | 7/2010 | Khakhalev | B23K 20/10 429/211 |
| 2010/0266904 A1 | 10/2010 | Jeon et al. | |
| 2010/0266905 A1 | 10/2010 | Jeon et al. | |
| 2010/0273064 A1 | 10/2010 | Jeon et al. | |
| 2011/0008684 A1 | 1/2011 | Jeon et al. | |
| 2011/0111305 A1 | 5/2011 | Jeon et al. | |
| 2011/0111307 A1 | 5/2011 | Koh et al. | |
| 2011/0123872 A1 | 5/2011 | Koh et al. | |
| 2011/0143217 A1 | 6/2011 | Arora et al. | |
| 2011/0171539 A1 | 7/2011 | Patoux et al. | |
| 2011/0195317 A1 | 8/2011 | Koh et al. | |
| 2011/0256458 A1 | 10/2011 | Tani | |
| 2011/0311866 A1 | 12/2011 | Lim et al. | |
| 2012/0009485 A1 | 1/2012 | Xu | |
| 2012/0136175 A1 | 5/2012 | Fuseya et al. | |
| 2012/0149852 A1 | 6/2012 | Dennes et al. | |
| 2012/0164519 A1 | 6/2012 | Lee et al. | |
| 2012/0164542 A1 | 6/2012 | Iwaya | |
| 2012/0196190 A1 | 8/2012 | Jeon et al. | |
| 2012/0208093 A1 | 8/2012 | Ihara et al. | |
| 2012/0219866 A1 | 8/2012 | Onuki et al. | |
| 2012/0301795 A1 | 11/2012 | Kaneko et al. | |
| 2012/0321965 A1 | 12/2012 | Fujikawa et al. | |
| 2012/0328938 A1 | 12/2012 | Geiculescu et al. | |
| 2013/0029230 A1 | 1/2013 | Park et al. | |
| 2013/0029231 A1 | 1/2013 | Jeon et al. | |
| 2013/0149602 A1 | 6/2013 | Luski et al. | |
| 2013/0189591 A1 | 7/2013 | Nishimura et al. | |
| 2013/0309564 A1 | 11/2013 | Yoshida et al. | |
| 2013/0337342 A1 | 12/2013 | Hallac et al. | |
| 2014/0017559 A1 | 1/2014 | Kawasaki et al. | |
| 2014/0017572 A1 | 1/2014 | Uehara et al. | |
| 2014/0045002 A1 | 2/2014 | Yokoyama et al. | |
| 2014/0045034 A1 | 2/2014 | Kondo et al. | |
| 2014/0045049 A1 | 2/2014 | Iyori et al. | |
| 2014/0045050 A1 | 2/2014 | Hattori et al. | |
| 2014/0045051 A1 | 2/2014 | Hattori et al. | |
| 2014/0045057 A1 | 2/2014 | Tode et al. | |
| 2014/0045077 A1 | 2/2014 | Minami et al. | |
| 2014/0079990 A1 | 3/2014 | Yanagida et al. | |
| 2014/0120415 A1 | 5/2014 | Suguro et al. | |
| 2014/0141323 A1 | 5/2014 | Saruwatari et al. | |
| 2014/0178772 A1 | 6/2014 | Jeong et al. | |
| 2014/0227584 A1 | 8/2014 | Holstein et al. | |
| 2014/0234701 A1 | 8/2014 | Tanaka et al. | |
| 2014/0243561 A1 | 8/2014 | Mueller et al. | |
| 2014/0248529 A1 | 9/2014 | Chen et al. | |
| 2014/0302401 A1 | 10/2014 | Burkhardt et al. | |
| 2014/0302402 A1 | 10/2014 | Chen et al. | |
| 2014/0308578 A1 | 10/2014 | Onizuka et al. | |

(56) References Cited

U.S. PATENT DOCUMENTS

| | | | |
|---|---|---|---|
| 2014/0322579 A1 | 10/2014 | Mitsuhashi et al. |
| 2014/0322616 A1 | 10/2014 | Onizaki et al. |
| 2014/0329141 A1 | 11/2014 | Onizuka et al. |
| 2015/0049642 A1 | 2/2015 | Eng et al. |
| 2015/0086862 A1 | 3/2015 | Osada et al. |
| 2015/0111112 A1 | 4/2015 | Petrov et al. |
| 2015/0140444 A1 | 5/2015 | Dubois et al. |
| 2015/0171467 A1 | 6/2015 | Dubois et al. |
| 2015/0303521 A1 | 10/2015 | Sasaki et al. |
| 2016/0049691 A1 | 2/2016 | Suzuki et al. |
| 2016/0087307 A1 | 3/2016 | Burkhardt et al. |

FOREIGN PATENT DOCUMENTS

| | | |
|---|---|---|
| CN | 102983358 A | 3/2013 |
| CN | 103117414 A | 5/2013 |
| CN | 103165939 A | 6/2013 |
| CN | 103682440 A | 3/2014 |
| CN | 103730688 A | 4/2014 |
| CN | 103943884 A | 7/2014 |
| CN | 103972588 A | 8/2014 |
| EP | 0924788 A1 | 6/1999 |
| EP | 1890357 A1 | 2/2008 |
| EP | 2037029 A1 | 3/2009 |
| EP | 2365573 A3 | 9/2011 |
| EP | 2378602 A2 | 10/2011 |
| EP | 2535975 A1 | 12/2012 |
| EP | 2571089 A1 | 3/2013 |
| EP | 2626943 A1 | 8/2013 |
| EP | 2339684 B1 | 9/2013 |
| JP | 62290072 A | 12/1987 |
| JP | 620719 A | 1/1994 |
| JP | 3444607 B2 | 1/1994 |
| JP | 08298134 A | 11/1996 |
| JP | H9-199168 A | 7/1997 |
| JP | 3311611 B2 | 5/1998 |
| JP | 10116627 A | 6/1998 |
| JP | 1186901 A | 3/1999 |
| JP | 2000188128 A | 7/2000 |
| JP | 2001345120 A | 12/2001 |
| JP | 2002124263 A | 4/2002 |
| JP | 2003100342 A | 4/2003 |
| JP | 2003282138 A | 10/2003 |
| JP | 2004047131 A | 2/2004 |
| JP | 2009123465 | 6/2004 |
| JP | 2004281185 A | 7/2004 |
| JP | 2004241339 A | 8/2004 |
| JP | 2005078820 A | 3/2005 |
| JP | 2005293920 A | 10/2005 |
| JP | 2006032300 A | 2/2006 |
| JP | 2006140115 A | 6/2006 |
| JP | 2006172721 A | 6/2006 |
| JP | 2006172950 A | 6/2006 |
| JP | 2006331866 A | 7/2006 |
| JP | 2006210022 A | 8/2006 |
| JP | 2008123714 A | 5/2008 |
| JP | 2008159419 A | 7/2008 |
| JP | 2008288144 A | 11/2008 |
| JP | 4328915 B2 | 9/2009 |
| JP | 2011049153 A | 3/2011 |
| JP | 2011082033 A | 4/2011 |
| JP | 2012094491 A | 5/2012 |
| JP | 5201364 B2 | 6/2013 |
| JP | 5321063 B2 | 6/2013 |
| JP | 5235437 B2 | 7/2013 |
| JP | 2011071098 A | 4/2014 |
| JP | 2015005443 A | 1/2015 |
| KR | 100908570 B1 | 8/2005 |
| KR | 20130134237 A | 12/2013 |
| KR | 20140083170 A | 7/2014 |
| KR | 20140106355 A | 9/2014 |
| KR | 20150106557 A | 9/2015 |
| KR | 101561646 B1 | 10/2015 |
| WO | 9744842 A | 11/1997 |
| WO | WO2008079670 A1 | 7/2008 |
| WO | 2008153309 A1 | 12/2008 |
| WO | 2009022848 A1 | 2/2009 |
| WO | 2009035222 A1 | 3/2009 |
| WO | 2009038358 A1 | 3/2009 |
| WO | 2009040367 A1 | 4/2009 |
| WO | 2009084928 A2 | 7/2009 |
| WO | 2011051275 A1 | 5/2011 |
| WO | 2011099580 A1 | 8/2011 |
| WO | 2012046514 A1 | 4/2012 |
| WO | 2012132059 A1 | 10/2012 |
| WO | 2012132060 A1 | 10/2012 |
| WO | WO 2012132976 A1 | 10/2012 |
| WO | 2012005945 A1 | 12/2012 |
| WO | 2012170240 A1 | 12/2012 |
| WO | 2012176873 A1 | 12/2012 |
| WO | 2013010985 A1 | 1/2013 |
| WO | 2013033579 A1 | 3/2013 |
| WO | 2013137351 A1 | 9/2013 |
| WO | 2013180781 A1 | 12/2013 |
| WO | 2013180782 A1 | 12/2013 |
| WO | 2013180783 A1 | 12/2013 |
| WO | 2013184881 A1 | 12/2013 |
| WO | 2014080871 A1 | 5/2014 |
| WO | 2014165748 A1 | 10/2014 |
| WO | 2015046174 A1 | 4/2015 |
| WO | 2015051131 A1 | 4/2015 |
| WO | 2015051141 A1 | 4/2015 |
| WO | 2015121731 A1 | 8/2015 |
| WO | 2015179205 A1 | 11/2015 |
| WO | 2015179210 A1 | 11/2015 |
| WO | 2016025589 A1 | 2/2016 |
| WO | 2016044088 A1 | 3/2016 |

OTHER PUBLICATIONS

Liu et al. ("Understanding the Improved Electrochemical Performances of Fe-Substituted 5 V Spinel Cathode LiMn1.5Ni0.5O4" J. Phys. Chem. C 2009, 113, 15073-15079).*

Bessler et al., "Boron Complexes with Dicarboxylic Acids", Zeitschrift fuer Naturforschung, Teil B: Anorganische chemie, Organische Chemie, vol. 37B, Issue 8, pp. 1020-1025, Journal, 1982, CODEN: ZNBAD2, issn: 0340-5087. See also English abstract.

Henne, A.L, "A New Fluorination Method", J Am. Chem. Soc., 60(7), 1938, 1579-1571.

Hine, J. et al., "Methylenes as Intermediates in Polar Reactions. XXI. A Sulfur-containing Methylene", J. Amer. Chem. Soc. 82, 6118, 1960.

Jeong, S.-K., et al, "Surface Film Formation on a Graphite Negative Electrode in Lithium-Ion Batteries: Atomic Force Microscopy Study on the Effects of Film-Forming Additives in Propylene Carbonate Solutions", Langmuir, 2001, 17, 8281-8286.

Jung, H.M., et al., "Fluoropropane Sultone as an SEI-forming Additive that Outperforms Vinylene Carbonate", J. Mater. Chem. A, 2013, 1 11975.

Kudryavtsev, I.Y., et al, "Catalytic Phosphorylation of Polyfluoroalkanols", Izvestiya Akademii Nausk SSSR, Seriya Khimicheskaya, 1982, 11, 2535-2540. Translation.

McMillan, R. et al., "Fluoroethylene Carbonate Electrolyte and Its Use in Lithium Ion Batteries with Graphite Anodes", J Power Sources 81-82 (1999) 20-26.

Mogi, Ryo et al, "Effects of Some Organic Additives on Lithium Deposition in Propylene Carbonate" J. Electrochem. Soc., 2002, 149(12), A1578-A1583.

Nagasubramanian, G. "Fluoro-Carbonate Solvents for Li-Ion Cells", Proc. Electrochem. Soc., 2000, 99(25), 434-439.

Nakajima, T. et al., "Effect of Fluoroesters on the Low Temperature Electrochemical Characteristics of Graphite Electrode", J Fluorine Chem 87 (1998) 221-227.

Rajeshwaran, G. G., et al, "Lewis Acid-Mediated Michaelis-Arbuzov Reaction at Room Temperature: A Facile Preparation of Arylmethyl/Heteroarylmethyl Phosphonates", Org. Lett., 2011, 13, 1270-1273.

Sasaki, Y. et al, "Physical and Electrolytic Properties of Partially Fluorinated Organic Solvents and Its Application to Secondary

(56) References Cited

OTHER PUBLICATIONS

Lithium Batteries: Partially Fluorinated Dialkoxyethanes", ECS Transactions, 16, (35), 2009, 23-31.
Schmitz, R.W. et al, "Investigations on Novel Electrolytes, Solvents and SEI Additives for Use in Lithium-ion Batteries: Systematic Electrochemical Characterization and Detailed Analysis by Spectroscopic Methods", Progress Solid State Chem., 42 (2014) 65-84.
Sekiya, A. et al, "The Potential of Hydrofluoroethers to Replace CFCs, HCFCs, and PFCs", J Fluorine Chem, 101 (2000) 215-221.
SynQuest Laboratories, Inc. Research Chemicals Catalog, 2003, pp. 128-129.
Tarrant, P. et al, "Some Reactions of Fluoroethanes with Sodium Ethoxide", J. Am. Chem. Soc., 75, (1953), 932-934.
Von Cresce, A. et al, "Electrolyte Additive in Support of 5 V Li Ion Chemistry", J Electrochem. Soc., 158 (3), A337-A342 (2011).
Wachtler, M. et al., "The Behaviour of Graphite, Carbon Black, and $Li_4Ti_5O_{12}$ in LiBOB-Based Electrolytes", J. Applied Electrochemistry (2006) 36: 1199-1206.
Xu et al, "Sulfone-Based Electrolytes for Lithium-Ion Batteries", Journal of the electrochemical Society, 2002, A920-A926, 149 (7).
Xu, K. "Nonaqueous Liquid Electrolytes for Lithium-Based Rechargeable Batteries", Chem. Rev., 2004, 104, 4303-4418.
Yamaki, J.-I. et al, "Thermal Studies of Fluorinated Ester as a Novel Candidate for Electrolyte Solvent of Lithium Metal Anode Rechargeable Cells", J Power Sources, 102 (2001) 288-293.
Yang, L. et al., "Effect of Impurities and Moisture on Lithium Bisoxalatoborate (LiBOB) Electrolyte Performance in Lithium-Ion Cells", J. Power Sources 195 (2010) 1698-1705.
Yoon, S. et al, "Sb-Mox-C (M=Al, Ti, or Mo) Nanocomposite Anodes for Lithium-Ion Batteries", Chem. Mater. 2009, 21, 3898-3904.
Zaharov et al., (Izvestiya Akademii Nausk USSR, Seriya Khimicheskaya, No. 8, p. 1860, 1969, Translation.
Zhang, S.S., "A Review on Electrolyte Additives for Lithium-Ion Batteries", J Power Sources, 162 (2006) 1379-1394.
International Search Report and Written Opinion, Corresponding PCT International Application PCT/US2013/029815 Mailed Jun. 6, 2013.
International Search Report and Written Opinion, Corresponding PCT International Application PCT/US2013/029818 Mailed May 14, 2013.
International Search Reportand Written Opinion, Corresponding PCT International Application PCT/US2013/029825 Mailed May 14, 2013.
International Search Report and Written Opinion, Corresponding PCT International Application PCT/US2014/058845 Mailed Dec. 11, 2014.
International Search Report and Written Opinion, Corresponding PCT International Application PCT/US2014/058859 Mailed Feb. 25, 2015.
International Search Report and Written Opinion, Corresponding PCT International Application PCT/US2014/032961 Mailed Jul. 15, 2014.
International Search Report and Written Opinion, Corresponding PCT International Application PCT/US2015/030785 Mailed Jul. 16, 2015.
International Search Report and Written Opinion, Corresponding PCT International Application PCT/US2015/030807 Mailed Jul. 17, 2015.
International Search Report and Written Opinion, Corresponding PCT International Application PCT/US2015/044844 Mailed Dec. 22, 2015.
International Search Report and Written Opinion, Corresponding PCT International Application PCT/US2015/049642 Mailed Dec. 22, 2015.
Machine Translation of Abstract, JP3444607B2, espacenet.com.
Machine Translation of Abstract, JPH08298134A, espacenet.com.
Machine Translation, JP3311611B2 (JPH10116627A), Questel's orbits.com.
Machine Translation, JP2003100342A, Questel's orbits.com.
Machine Translation of Abstract, JP2009123465, Patent Abstracts of Japan.
Lee et al., SEI Layer-Forming Additives for $LINI_{0.5}MN_{1.5}O_4$/Graphite 5 V Li-Ion Batteries, Electrochemistry Communications (2007), vol. 9, pp. 801-806.
Liu Et At., Understanding the Improved Electrochemical Performances of Fe-Substituted 5 V Spinel Cathode $LIMN_{1.5}NI_{0.5}O_4$, J. Phys. Chem. C. (2009), vol. 113, pp. 15073-15079.
Smart et al., Li-Ion Electrolytes Containing Ester Co-Solvents for Wide Operating Temperature Range, ECS Transactions (2008) vol. 11, No. 29, pp. 99-108.
Smith et al., Electrolytes Containing Fluorinated Ester Co-Solvents for Low-Temperature Li-Ion Cells, ECS Transactions (2008), vol. 11, No. 29, pp. 91-98.
Zhong et al., Effects of Al Substitution for Ni and Mn on the Electrochemical Properties $LINI_{0.5}MN_{1.5}O_4$, Electrochimica Acta (2011), vol. 56, pp. 6554-6561.
International Search Report, Corresponding PCT International Application No. PCT/US2012/053439 (Chen et al.), mailed Jan. 22, 2013.
Related U.S. Appl. No. 14/241,894 (Holstein et al.), filed Aug. 31, 2012.
International Search Report, Related PCT International Application No. PCT/US2012/053415 (Holstein et al.), Mailed Jan. 22, 2013.

\* cited by examiner

LITHIUM ION BATTERY

This application claims priority under 35 U.S.C. §119(e) from, and claims the benefit of, U.S. Provisional Application No. 61/530,545, filed 2 Sep. 2011, and U.S. Provisional Application No. 61/654,184, filed 1 Jun. 2012, each of which is by this reference incorporated in its entirety as a part hereof for all purposes.

TECHNICAL FIELD

This invention relates to the field of lithium ion batteries. More specifically, the invention relates to a lithium ion battery comprising a spinel cathode and a nonaqueous electrolyte.

BACKGROUND

Lithium ion batteries are being intensively pursued for hybrid electric vehicle (HEV) and plug-in hybrid electric vehicle (PHEV) applications. Both the 4 V spinel $LiMn_2O_4$ and 3.4 V olivine $LiFePO_4$ cathodes have drawn much attention in this regard because Mn and Fe are inexpensive and environmentally benign. Additionally, these cathodes provide a higher rate capability and better safety compared to layered oxide cathodes. However, both $LiMn_2O_4$ and $LiFePO_4$ cathodes have limited energy density due to their low capacity or operating voltage. One way to improve the energy and power density is to increase the operating voltage. In this regard, the 5 V spinel cathode $LiMn_{1.5}Ni_{0.5}O_4$ has drawn much attention due to a nearly flat operating voltage close to 5 V and an acceptable capacity arising from operation of the $Ni^{2+/3+}$ and $Ni^{3+/4+}$ redox couples.

The $LiMn_{1.5}Ni_{0.5}O_4$ cathode, however, can be characterized by suboptimal cycling performance in a conventional carbonate electrolyte, and this may be due to the large lattice strain during cycling, which involves the formation of three cubic phases with a large lattice parameter difference during the charge-discharge process. Other contributors to suboptimal cycling performance can include the $Li_xNi_{1-x}O$ impurity, and the corrosion reaction between the cathode surface and the carbonate electrolyte at the high operating voltage of approximately 5 V.

Partial substitution of Mn and Ni in $LiMn_{1.5}Ni_{0.5}O_4$ by other elements such as Li, Al, Mg, Ti, Cr, Fe, Co, Cu, Zn and Mo has been pursued to improve the cyclability, as discussed in U.S. Pat. No. 6,337,158 (Nakajima); and in Liu et al, *J. Phys. Chem. C* 13:15073-15079, 2009. Although improvement in cycling performance can be achieved in a conventional carbonate electrolyte at room temperature by partial cation substitution, high-temperature cycling performance still remains a problem due to the intrinsic instability of the traditional carbonate electrolyte and the accelerated decomposition reaction at elevated temperature.

U.S. Patent Application Publication No. 2010/0035162 (Chiga) described a nonaqueous electrolyte for use in a secondary battery that comprises a chain fluorinated carboxylic acid ester represented by the formula $CH_3COOCH_2CH_{3-x}F_x$, wherein x is 2 or 3, and a film-forming chemical that decomposes in the range of +1.0 to 3.0 V based on the equilibrium potential between metal lithium and lithium ion. This electrolyte was in various embodiments used in a secondary battery that was provided with a lithium-transition metal oxide cathode having a charge cut-off voltage of 4.2 V.

Despite the efforts in the art as described above, a need remains for a lithium ion battery that operates at high voltage (i.e. up to about 5 V) and has improved cycling performance at high temperature.

SUMMARY

In one embodiment, there is provided herein a lithium ion battery comprising:
(a) a housing;
(b) an anode and a cathode disposed in the housing and in conductive contact with one another, wherein the cathode is a manganese cathode comprising a lithium-containing manganese composite oxide having a spinel structure as active material, the lithium-containing manganese composite oxide being represented by the formula

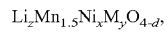
$Li_zMn_{1.5}Ni_xM_yO_{4-d}$, wherein M is at least one metal selected from the group consisting of Al, Cr, Fe, Ga, Zn, Co, Nb, Mo, Ti, Zr, Mg, V and Cu, and $0.38 \leq x < 0.5$, $0 < y \leq 0.12$, $0 \leq d \leq 0.3$, $0.00 < z \leq 1.1$, and z changes in accordance with release and uptake of lithium ions and electrons during charge and discharge;
(c) a nonaqueous electrolyte composition disposed in the housing and providing an ionically conductive pathway between the anode and the cathode, wherein the nonaqueous electrolyte composition comprises at least one electrolyte salt and at least one fluorinated acyclic carboxylic acid ester and/or at least one fluorinated acyclic carbonate; and
(d) a porous separator between the anode and the cathode.

In another embodiment, there is provided herein a lithium ion battery comprising:
(a) a housing;
(b) an anode and a cathode disposed in the housing and in conductive contact with one another, wherein the cathode is a manganese cathode comprising a lithium-containing manganese composite oxide having a spinel structure as active material, the lithium-containing manganese composite oxide being represented by the formula

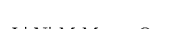
$Li_zNi_xM_yMn_{2-x-y}O_{4-d}$, (Formula IB)

wherein z is 0.03 to 1.0; z changes in accordance with release and uptake of lithium ions and electrons during charge and discharge; x is 0.3 to 0.6; M comprises one or more of Cr, Fe, Co, Li, Al, Ga, Nb, Mo, Ti, Zr, Mg, Zn, V, and Cu; y is 0.01 to 0.18, and d is 0 to 0.3;
(c) a nonaqueous electrolyte composition disposed in the housing and providing an ionically conductive pathway between the anode and the cathode, wherein the nonaqueous electrolyte composition comprises at least one electrolyte salt and at least one fluorinated acyclic carboxylic acid ester and/or at least one fluorinated acyclic carbonate; and
(d) a porous separator between the anode and the cathode.

In a further alternative embodiment, there is provided herein a lithium ion battery comprising:
(a) a housing;
(b) an anode and a cathode disposed in the housing and in conductive contact with one another, wherein the cathode comprises a lithium-containing manganese composite oxide having a spinel structure as active material, the lithium-containing manganese composite oxide being represented by the formula

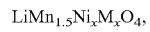
$LiMn_{1.5}Ni_xM_yO_4$, wherein M is at least one metal selected from the group consisting of Al, Cr, Fe, Ga and Zn, $0.4 \leq x < 0.5$, and $0 < y \leq 0.1$;

(c) a nonaqueous electrolyte composition disposed in the housing and providing an ionically conductive pathway between the anode and the cathode, wherein the nonaqueous electrolyte composition comprises at least one electrolyte salt and at least one fluorinated acyclic carboxylic acid ester and/or at least one fluorinated acyclic carbonate; and (d) a porous separator between the anode and the cathode.

In yet another alternative embodiment, a fluorinated acyclic carboxylic acid ester can be represented by the following structural formula:

$$R^1-C(O)O-R^2,$$

wherein $R^1$ is selected from the group consisting of $CH_3$, $CH_2CH_3$, $CH_2CH_2CH_3$, $CH(CH_3)_2$, $CF_3CF_2H$, $CFH_2$, $CF_2R^3$, $CFHR^3$, and $CH_2R^f$, wherein $R^2$ is independently selected from the group consisting of $CH_3$, $CH_2CH_3$, $CH_2CH_2CH_3$, $CH(CH_3)_2$, and $CH_2R^f$, wherein $R^3$ is a $C_1$ to $C_3$ alkyl group which is optionally substituted with at least one fluorine, wherein $R^f$ is a $C_1$ to $C_3$ alkyl group substituted with at least one fluorine, and further wherein at least one of $R^1$ or $R^2$ contains at least one fluorine and when $R^1$ is $CF_2H$, $R^2$ is not $CH_3$, and/or and a fluorinated acyclic carbonate can be represented by the following structural formula:

$$R^4-O-C(O)O-R^5,$$

wherein $R^4$ and $R^5$ are independently selected from the group consisting of $CH_3$, $CH_2CH_3$, $CH_2CH_2CH_3$, $CH(CH_3)_2$, and $CH_2R^f$ where $R^f$ is a $C_1$ to $C_3$ alkyl group substituted with at least one fluorine, and further wherein at least one of $R^4$ or $R^5$ contains at least one fluorine; and In yet another embodiment hereof, there is disclosed an electronically powered or assisted device containing a lithium ion battery such as described above.

DETAILED DESCRIPTION

Figure 1:
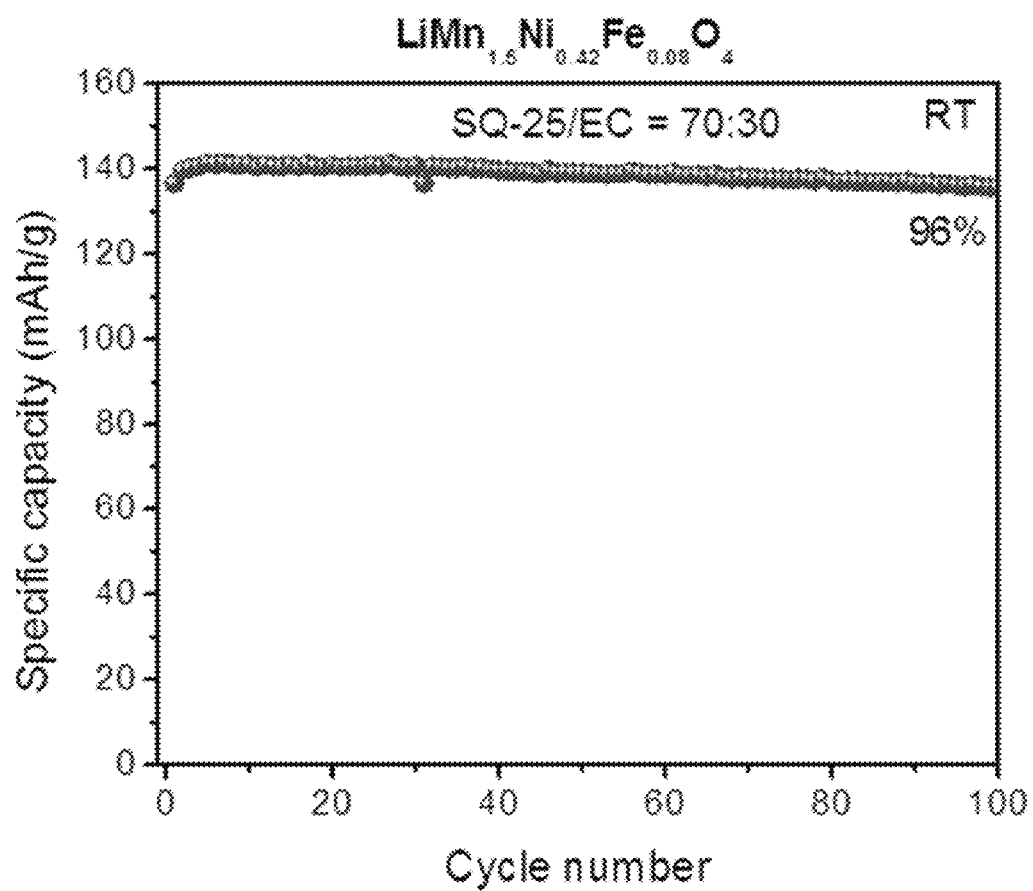
FIGS. 1-11 show in graphical form the results of the experiments run in Examples 1-11, respectively.

Disclosed herein is a lithium ion battery, which is a type of rechargeable battery in which lithium ions move from the anode to the cathode during discharge, and from the cathode to the anode during charge. The lithium ion battery disclosed herein includes a housing; an anode and a cathode disposed in the housing and in conductive contact with one another; a nonaqueous electrolyte composition providing an ionically conductive pathway between the anode and the cathode; and a porous separator between the anode and the cathode. The lithium ion battery disclosed herein can operate with the cathode at a high voltage (i.e. up to about 5 V relative to a Li|Li+ reference electrode), and this type of battery can thus in some instances be referred to as a "high voltage" lithium ion battery. It has improved cycling performance at high temperature compared to other, conventional lithium ion batteries.

The lithium ion battery hereof includes a cathode, which is the electrode of an electrochemical cell at which reduction occurs during discharge. In a galvanic cell, such as a battery, the cathode is the more positively charged electrode. The cathode in the lithium ion battery hereof is a manganese cathode comprising a lithium-containing manganese composite oxide having a spinel structure as cathode active material.

The lithium-containing manganese composite oxide in a cathode as used herein is represented by the formula $$Li_zMn_{1.5}Ni_xM_yO_{4-d},\quad\text{(Formula IA)}$$

wherein M is at least one metal selected from the group consisting of Al, Cr, Fe, Ga, Zn, Co, Nb, Mo, Ti, Zr, Mg, V, and Cu, and 0.38≤x<0.5, 0<y≤0.12, 0≤d≤0.3, 0.00<z≤1.1, and z changes in accordance with release and uptake of lithium ions and electrons during charge and discharge.

In one embodiment, M in the above formula is Fe; in another embodiment, M in the above formula is Ga; and in another embodiment, M is the above formula is Fe and Ga.

In the various embodiments hereof, the values of x and y can be selected from any one of the members of the group of couples consisting of: x=0.38/y=0.12, x=0.39/y=0.11, x=0.40/y=0.1, x=0.41/y=0.09, x=0.42/y=0.08, x=0.43/y=0.07, x=0.44/y=0.06, x=0.45/y=0.05, x=0.46/y=0.04, x=0.47/y=0.03, x=0.48/y=0.02, x=0.49/y=0.01.

In one embodiment, z has a value given by 0.03≤z≤1.1. In another embodiment, z has a value given by 0.03≤z≤1.0.

In one embodiment, M in the above formula is at least one metal selected from the group consisting of Al, Cr, Fe, Ga and Zn, and 0.4≤x<0.5, and 0<y≤0.1, z=1 and d=0.

The lithium cathode material described above is believed to be stabilized by the presence of the M component in the compound. Manganese cathodes stabilized by other systems may also comprise spinel-layered composites which contain a manganese-containing spinel component and a lithium rich layered structure, as described in U.S. Pat. No. 7,303,840.

In an alternative embodiment, the lithium-containing manganese composite oxide in a cathode as used herein comprises oxides of the formula $$Li_zNi_xM_yMn_{2-x-y}O_{4-d},\quad\text{(Formula IB)}$$

wherein z is 0.03 to 1.0; z changes in accordance with release and uptake of lithium ions and electrons during charge and discharge; x is 0.3 to 0.6; M comprises one or more of Cr, Fe, Co, Li, Al, Ga, Nb, Mo, Ti, Zr, Mg, Zn, V, and Cu; y is 0.01 to 0.18, and d is 0 to 0.3. In one embodiment, in the above formula, x is 0.38 to 0.48, y is 0.03 to 0.12, and d is 0 to 0.1. In one embodiment, in the above formal, M is one or more of Li, Cr, Fe, Co, and Ga.

The cathode active material as described and used herein can be prepared using methods such as the hydroxide precursor method described by Liu et al (*J. Phys. Chem. C* 13:15073-15079, 2009). In that method, hydroxide precursors are precipitated from a solution containing desired amounts of manganese, nickel and other desired metal(s) acetates by the addition of KOH. The resulting precipitate is oven-dried and then fired with a desired amount of LiOH.H₂0 at about 800 to about 950° C. in oxygen for 3 to 24 hours, as described in detail in the examples herein. Alternatively, the cathode active material can be prepared using a solid phase reaction process or a sol-gel process as described in U.S. Pat. No. 5,738,957 (Amine).

The cathode, in which the cathode active material is contained, may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

The lithium ion battery hereof further contains an anode, which is the electrode of an electrochemical cell at which oxidation occurs during discharge. In a galvanic cell, such as a battery, the anode is the more negatively charged electrode.

The anode contains anode active material, which can be any material capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; and lithium titanates such as $Li_4Ti_5O_{12}$ and $LiTi_2O_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as NEI Inc. (Somerset N.J.) and Farasis Energy Inc. (Hayward Calif.).

The lithium ion battery hereof further contains a nonaqueous electrolyte composition, which is a chemical composition suitable for use as an electrolyte in a lithium ion battery. The electrolyte composition typically contains at least one nonaqueous solvent and at least one electrolyte salt. The electrolyte salt is an ionic salt that is at least partially soluble in the solvent of the nonaqueous electrolyte composition and that at least partially dissociates into ions in the solvent of the nonaqueous electrolyte composition to form a conductive electrolyte composition. The conductive electrolyte composition puts the cathode and anode in ionically conductive contact with one another such that ions, in particular lithium ions, are free to move between the anode and the cathode and thereby conduct charge through the electrolyte composition between the anode and the cathode.

The solvent in the nonaqueous electrolyte composition of the lithium ion battery hereof can contain at least one fluorinated acyclic carboxylic acid ester and/or at least one fluorinated acyclic carbonate. A fluorinated acyclic carboxylic acid ester suitable for use herein as a solvent can be described by structural formula as follows:

$$R^1—C(O)O—R^2, \quad \text{(Formula IIA)}$$

wherein $R^1$ is selected from the group consisting of $CH_3$, $CH_2CH_3$, $CH_2CH_2CH_3$, $CH(CH_3)_2$, $CF_3$, $CF_2H$, $CFH_2$, $CF_2R^3$, $CFHR^3$, and $CH_2R^f$, and $R^2$ is independently selected from the group consisting of $CH_3$, $CH_2CH_3$, $CH_2CH_2CH_3$, $CH(CH_3)_2$, and $CH_2R^f$, where $R^3$ is a $C_1$ to $C_3$ alkyl group which is optionally substituted with at least one fluorine, and $R^f$ is a $C_1$ to $C_3$ alkyl group substituted with at least one fluorine, and further wherein at least one of $R^1$ or $R^2$ contains at least one fluorine and when $R^1$ is $CF_2H$, $R^2$ is not $CH_3$.

In some embodiments, $R^1$ is selected from the group consisting of $CH_3$, $CH_2CH_3$, $CH_2CH_2CH_3$, $CH(CH_3)_2$, $CF_3$, $CFHR^3$, and $CH_2R^f$, and $R^2$ is independently selected from the group consisting of $CH_3$, $CH_2CH_3$, $CH_2CH_2CH_3$, $CH(CH_3)_2$, and $CH_2R^f$, where $R^3$ is a $C_1$ to $C_3$ alkyl group which is optionally substituted with at least one fluorine, and $R^f$ is a $C_1$ to $C_3$ alkyl group substituted with at least one fluorine, and further wherein at least one of $R^1$ or $R^2$ contains at least one fluorine.

In some embodiments, $R^1$ is selected from the group consisting of $CH_3$, $CH_2CH_3$, $CH_2CH_2CH_3$, $CH(CH_3)_2$, and $CH_2R^f$, and $R^2$ is independently selected from the group consisting of $CH_3$, $CH_2CH_3$, $CH_2CH_2CH_3$, $CH(CH_3)_2$, $CH_2R^f$, where $R^f$ is a $C_1$ to $C_3$ alkyl group substituted with at least one fluorine, and further wherein at least one of $R^1$ or $R^2$ contains at least one fluorine.

In other alternative embodiments a fluorine-containing carboxylic acid ester suitable for use herein can be represented by the formula:

$$R^8—C(O)O—R^9 \quad \text{(Formula IIB)}$$

where $R^8$ and $R^9$ independently represent an alkyl group, the sum of carbon atoms in $R^8$ and $R^9$ is 2 to 7, at least two hydrogens in $R^8$ and/or $R^3$ are replaced by fluorines and neither $R^8$ nor $R^9$ contains a $FCH_2$ or FCH group.

In some embodiments the fluorinated acyclic carboxylic acid ester is selected from one or more members of the group consisting of:

$CH_3C(O)OCH_2CF_2H$ (2,2,-difluoroethyl acetate, CAS No. 1550-44-3), $CH_3C(O)OCH_2CF_3$ (2,2,2-trifluoroethyl acetate, CAS No. 406-95-1), and $CH_3C(O)OCH_2CF_2CF_2H$ (2,2,3,3-tetrafluoropropyl acetate, CAS No. 681-58-3).

In one particular embodiment, the fluorinated acyclic carboxylic ester solvent is $CH_3C(O)OCH_2CF_2H$.

A fluorinated acyclic carbonate suitable for use herein as a solvent can be described by structural formula as follows:

$$R^4—O—C(O)O—R^5 \quad \text{(Formula III)}$$

wherein $R^4$ and $R^5$ are independently selected from the group consisting of $CH_3$, $CH_2CH_3$, $CH_2CH_2CH_3$, $CH(CH_3)_2$, and $CH_2R^f$ where $R^f$ is a $C_1$ to $C_3$ alkyl group substituted with at least one fluorine, and further wherein at least one of $R^4$ or $R^5$ contains at least one fluorine.

In some embodiments, the fluorinated acyclic carbonate solvent is selected from one or more members of the group consisting of:

$CH_3OC(O)OCH_2CF_2H$ (methyl 2,2-difluoroethyl carbonate, CAS No. 916678-13-2), $CH_3OC(O)OCH_2CF_3$ (methyl 2,2,2-trifluoroethyl carbonate, CAS No. 156783-95-8), and $CH_3OC(O)OCH_2CF_2CF_2H$ (methyl 2,2,3,3-tetrafluoropropyl carbonate, CAS No. 156783-98-1).

In one particular embodiment, the fluorinated acyclic carbonate solvent is $CH_3OC(O)OCH_2CF_3$.

A mixture of two or more of these fluorinated acyclic carboxylic acid ester and/or fluorinated acyclic carbonate solvents may also be used.

Fluorinated acyclic carboxylic acid esters and fluorinated acyclic carbonates suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al (WO 2009/040367 A1, Example 5). Similarly, methyl chloroformate may be reacted with 2,2-difluoroethanol to form methyl 2,2-difluoroethyl carbonate. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

The nonaqueous electrolyte composition in a lithium ion battery hereof can also contain a solvent mixture that includes at least one fluorinated acyclic carboxylic acid ester and/or a fluorinated acyclic carbonate, as described above, and at least one co-solvent. Examples of suitable co-solvents include without limitation ethylene carbonate (EC), propylene carbonate, fluoroethylene carbonate (FEC), tetramethylene sulfone and ethyl methyl sulfone. For best results, it is desirable to use a co-solvent that is battery grade or has a purity level of at least about 99.9%, and more particularly at least about 99.99%. In one embodiment, the co-solvent is ethylene carbonate. In another embodiment, the fluorinated acyclic carboxylic acid ester is $CH_3CO_2CH_2CF_2H$ and the co-solvent is ethylene carbonate or fluorinated ethylene carbonate.

A fluorinated acyclic carboxylic acid ester and/or a fluorinated acyclic carbonate, as described above, and the co-solvent may be combined in various ratios to form a solvent mixture as used in an electrolyte composition, depending on the desired properties of the electrolyte composition. In one embodiment, the fluorinated acyclic carboxylic acid ester and/or fluorinated acyclic carbonate comprises about 40% to about 90% by weight of the solvent mixture. In another embodiment, the fluorinated acyclic carboxylic acid ester and/or fluorinated acyclic carbonate comprises about 50% to about 80% by weight of the solvent mixture. In another embodiment, the fluorinated acyclic carboxylic acid ester and/or fluorinated acyclic carbonate comprises about 60% to about 80% by weight of the solvent mixture. In another embodiment, the fluorinated acyclic carboxylic acid ester and/or fluorinated acyclic carbonate comprises about 65% to about 75% by weight of the solvent mixture. In another embodiment, the fluorinated acyclic carboxylic acid ester and/or fluorinated acyclic carbonate comprises about 70% by weight of the solvent mixture.

In another embodiment, the nonaqueous electrolyte composition comprises a solvent mixture containing the fluorinated acyclic carboxylic acid ester $CH_3CO_2CH_2CF_2H$ and ethylene carbonate, wherein $CH_3CO_2CH_2CF_2H$ comprises about 50% to about 80% by weight of the solvent mixture. In another embodiment, the nonaqueous electrolyte composition contains a solvent mixture of the fluorinated acyclic carboxylic ester $CH_3CO_2CH_2CF_2H$ and ethylene carbonate, wherein $CH_3CO_2CH_2CF_2H$ comprises about 65% to about 75% by weight of the solvent mixture.

A nonaqueous electrolyte composition in a lithium ion battery herein also contains at least one electrolyte salt. Suitable electrolyte salts include without limitation
  lithium hexafluorophosphate, $LiPF_3(CF_2CF_3)_3$,
  lithium bis(trifluoromethanesulfonyl)imide,
  lithium bis(perfluoroethanesulfonyl)imide,
  lithium (fluorosulfonyl) (nonafluorobutanesulfonyl)imide,
  lithium bis(fluorosulfonyl)imide,
  lithium tetrafluoroborate,
  lithium perchlorate,
  lithium hexafluoroarsenate,
  lithium trifluoromethanesulfonate,
  lithium tris(trifluoromethanesulfonyl)methide,
  lithium bis(oxalato)borate,
  lithium difluoro(oxalato)borate,
  $Li_2B_{12}F_{12-x}H_x$ where x is equal to 0 to 8, and mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be present in the nonaqueous electrolyte composition in an amount of about 0.2 to about 2.0 M, more particularly about 0.3 to about 1.5 M, and more particularly about 0.5 to about 1.2 M.

A nonaqueous electrolyte composition in a lithium ion battery hereof may also contain at least one additive that are believed to contribute to film forming on one or both of the electrodes. Suitable such additives include without limitation
  fluoroethylene carbonate (also referred to herein as 4-fluoro-1,3-dioxolan-2-one, CAS No. 114435-02-8) and its halogenated, $C_1$~$C_3$ and halogenated $C_1$~$C_3$ derivatives,
  ethylene sulfate and its halogenated, $C_1$~$C_3$ and halogenated $C_1$~$C_3$ derivatives,
  vinyl ethylene carbonate and its halogenated, $C_1$~$C_3$ and halogenated $C_1$~$C_3$ derivatives,
  vinylene carbonate and its halogenated, $C_1$~$C_3$ and halogenated $C_1$~$C_3$ derivatives,
  maleic anhydride and its halogenated, $C_1$~$C_3$ and halogenated $C_1$~$C_3$ derivatives, and vinyl acetate.

In one embodiment, the preferred additive is fluoroethylene carbonate.

These additives are generally available commercially; fluoroethylene carbonate, for example, is available from companies such as China LangChem INC. (Shanghai, China) and MTI Corp. (Richmond, Calif.). It is desirable to purify these additives to a purity level of at least about 99.0%, more particularly at least about 99.9%. Purification may be done using known methods, as described above. This type of additive, if used, is generally present in an amount of about 0.01% to about 5%, more particularly about 0.1% to about 2%, and more particularly about 0.5% to about 1.5% by weight of the total electrolyte composition.

The lithium ion battery hereof also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can form on the anode and cathode. Examples of porous separators suitable for use herein are disclosed in U.S. application Ser. No. 12/963,927 (filed 9 Dec. 2010), published as U.S. Patent Application Publication No. 2012/0149852 A1, which is by this reference incorporated in its entirety as a part hereof for all purposes.

The housing of the lithium ion battery hereof may be any suitable container to house the lithium ion battery components described above. Such a container may be fabricated in the shape of small or large cylinder, a prismatic case or a pouch.

A lithium ion battery hereof may be used for grid storage or as a power source in various electronically powered or assisted devices such as a transportation device (including a motor vehicle, automobile, truck, bus or airplane), a computer, a telecommunications device, a camera, a radio, or a power tool.

EXAMPLES

The operation and effects of certain embodiments of the inventions hereof may be more fully appreciated from a series of examples, as described below. The embodiments on which these examples are based are representative only, and the selection of those embodiments to illustrate the inventions hereof does not indicate that materials, components, reactants, conditions, techniques, configurations or designs not described in the examples are not suitable for use herein, or that subject matter not described in the examples is excluded from the scope of the appended claims and equivalents thereof. The significance of the examples is better understood by comparing the results obtained therefrom with the results obtained from certain trial runs that are designed to serve as controlled experiments and provide a basis for such comparison since a different type of solvent was used in those trial runs.

The meaning of abbreviations used in the examples is as follows: "g" means gram(s), "mg" means milligram(s), "µg" means microgram(s), "L" means liter(s), "mL" means milliliter(s), "mol" means mole(s), "mmol" means millimole(s), "M" means molar concentration, "wt %" means percent by weight, "Hz" means hertz, "mS" means millisiemen(s), "mA" mean milliamp(s), "mAh/g" means milliamp hour(s) per gram, "V" means volt(s), "x C" refers to a constant current that can fully charge/discharge the cathode in 1/x hours, "SOC" means state of charge, "SEI" means solid electrolyte interface formed on the surface of the electrode material, "kPa" means kilopascal(s), "rpm" means revolutions per minute, "psi" means pounds per square inch.

Preparation of $LiMn_{1.5}Ni_{0.42}Fe_{0.08}O_4$ Cathode Active Material

Iron-doped $LiMn_{1.5}Ni_{0.5}O_4$ was synthesized by the hydroxide precursor method described by Liu et al (*J. Phys. Chem. C* 113, 15073-15079, 2009). In this method, hydroxide precursors were precipitated from a 100 mL solution containing 7.352 g of $Mn(CH_3COO)_2 \cdot 4H_2O$, 2.090 g of $Ni(CH_3COO)_2 \cdot 4H_2O$, and 0.278 g of $Fe(CH_3COO)_2$ by adding this solution to 200 mL of 3.0 M KOH solution dropwise. The resulting precipitate was collected by filtration, washed extensively with deionized water, and then dried in an oven, yielding 3.591 g of the transition metal hydroxides.

The precipitate containing the transition metal hydroxides was then mixed with 0.804 g of $LiOH \cdot H_2O$ at 900° C. in air for 12 h with a heating/cooling rate of 1° C./min. The resulting $LiMn_{1.5}Ni_{0.42}Fe_{0.8}O_4$ showed the same cubic spinel structure as $LiMn_{1.5}Ni_{0.5}O_4$ without impurities, as determined by X-ray powder diffraction.

Preparation of $LiMn_{1.5}Ni_{0.42}Fe_{0.08}O_4$ Cathode

The $LiMn_{1.5}Ni_{0.42}Fe_{0.08}O_4$ (2.08 g) cathode active material, prepared as described above, 0.26 g of Denka black (acetylene black, obtained from DENKA Corp., Japan), 2.16 g of polyvinylidene difluoride (PVDF) solution (12 wt % in N-methylpyrrolidone (NMP), Kureha America Inc., New York, N.Y., KFL#1120), and an additional 2.93 g of NMP were mixed first using a planetary centrifugal mixer (THINKY ARE-310, THINKY Corp., Japan) at 2,000 rpm and then using a shear mixer (IKA® Works, Wilmington, N.C.) to form a uniform slurry. The slurry was coated on aluminum foil using a doctor blade gate, and dried in a convection oven at 100° C. for 10 to 15 min. The resulting electrode was calendared at ambient temperature between 102 mm diameter steel rolls at a nip force of 370 kg. The electrode was further dried in a vacuum oven at 90° C. at −25 inches of Hg (−85 kPa) for 6 h.

Preparation of Nonaqueous Electrolyte Composition Comprising 2,2-Difluoroethyl Acetate 2,2-Difluoroethyl acetate, obtained from Matrix Scientific (Columbia, S.C.), was purified by spinning band distillation twice to 99.99% purity, as determined by gas chromatography using a flame ionization detector. The purified 2,2-difluoroethyl acetate (7.32 g) and 3.10 g of ethylene carbonate (99%, anhydrous, Sigma-Aldrich, Milwaukee, Wis.) were mixed together. To 9.0 mL of the resulting solution was added 1.35 g of lithium hexafluorophosphate (99.99% battery grade, Sigma-Aldrich) and the mixture was shaken for a few minutes until all the solid was dissolved. In the Figures, this electrolyte composition is referred to as "SQ-25/EC" or "TE-5".

Preparation of Nonaqueous Electrolyte Composition Comprising 2,2-Difluoroethyl Acetate and Fluoroethylene Carbonate Additive 4-Fluoro-1,3-dioxolan-2-one, obtained from China LangChem INC, (Shanghai, China), was purified by vacuum distillation. The purified 4-fluoro-1,3-dioxolan-2-one (0.053 g) was added to 5.30 g of the nonaqueous electrolyte composition described above and the mixture was shaken for several minutes.

Synthesis of Methyl 2,2,2-Trifluoroethyl Carbonate ($CH_3OC(O)OCH_2CF_3$)

In a dry-box, chloroformate (232.0 g, Sigma-Aldrich) was added to a solution of 2,2,2-trifluoroethanol (202.0 g, Sigma-Aldrich), pyridine (194.0 g, anhydrous, Sigma-Aldrich), and dichloromethane (1.5 L, anhydrous, EMD Chemicals, Gibbstown, N.J., at 0 to 15° C. The mixture was stirred at room temperature over the weekend. A sample was taken for NMR analysis, which indicated that the conversion of 2,2,2-trifluoroethanol was 100%. The mixture was filtered. The collected solid was washed with dichloromethane, and the combined organic liquid filtrate was washed five times with 50 mL portions of 5% HCl. A sample was taken for NMR analysis, and pyridine was detected. The organic liquid filtrate was then washed four more times with 25 mL portions of 5% HCl, after which no pyridine was detected by NMR. The organic liquid filtrate was washed with brine (50 mL). Dichloromethane was removed from the organic liquid filtrate by rotoevaporation. The crude product (273 g) obtained was dried over molecular sieves, and then twice purified by spinning-band column distillation. Pure material (101.6 g) was obtained and used for the electrolyte composition.

Preparation of Nonaqueous Electrolyte Composition Comprising Methyl 2,2,2-Trifluoroethyl Carbonate, Ethylene Carbonate and Fluoroethylene Carbonate Additive Methyl 2,2,2-trifluoroethyl carbonate (10.0 g) was dried over 4A molecular sieves (1.0 g) over the weekend, and then further dried over 4A molecular sieves (1.0 g) overnight. The dried methyl 2,2,2-trifluoroethyl carbonate was then filtered with a PTFE (polytetrafluroethylene) filter plate with syringe. The dried, filtered methyl 2,2,2-trifluoroethyl carbonate (2.80 g) was mixed with ethylene carbonate (Novolyte, 1.20 g) and the resulting solvent mixture was shaken until all solid was dissolved. To a 2-mL GC vial (oven dried), was added $LiPF_6$ (0.076 g, Novolyte, Cleveland Ohio), followed by the addition of 1.0 mL of the solvent mixture. The net weight of the resulting mixture was 1.36 g. The mixture was shaken until all solid was dissolved. To the above mixture, 4-fluoro-1,3-dioxolan-2-one (14 mg, LongChem, Shanghai, China, purified by vacuum distillation) was added. The resulting nonaqueous electrolyte composition was shaken and stored in a dry-box.

Preparation of Nonaqueous Electrolyte Composition Comprising 2,2,2-Trifluoroethyl Acetate, Ethylene Carbonate and Fluoroethylene Carbonate Additive 2,2,2-Trifluoroethyl acetate ($CH_3C(O)OCH_2CF_3$), obtained from SynQuest Laboratories (Alachua Fla.), was purified by spinning-band column distillation twice to 99.9% purity, as determined by gas chromatography using a flame ionization detector. The purified 2,2,2-trifluoroethyl acetate (10.0 g) was dried over 4A molecular sieves (1.0 g) over the weekend, and further dried over 4A molecular sieves (1.0 g) overnight. The dried, purified 2,2,2-trifluoroethyl acetate was then filtered with a PTFE filter plate with syringe. The filtered material (2.80 g) was mixed with ethylene carbonate (Novolyte, 1.20 g) and the resulting solvent mixture was shaken until all solid was dissolved. To a 2 mL GC vial (oven dried), was added $LiPF_6$ (0.076 g, Novolyte, Cleveland Ohio), followed by the addition of 1.0 mL of the solvent mixture. The net weight of the resulting mixture was 1.38 g. The mixture was shaken until all solid was dissolved. To this mixture, 4-fluoro-1,3-dioxolan-2-one (14 mg, LongChem, Shanghai, China, purified by vacuum distillation) was added. The resulting nonaqueous electrolyte composition was shaken and stored in a dry-box.

Synthesis of Methyl 2,2-Difluoroethyl Carbonate ($CH_3OC(O)OCH_2CF_2H$)

Under nitrogen protection, chloroformate (136.1 g, Sigma-Aldrich) was added slowly via syringe pump, over a period of 3 h, to a solution of 2,2-difluoroethanol (113.9.0 g, Matrix Scientific, Columbia S.C., purified by spinning-band column distillation), pyridine (113.9 g, anhydrous, Sigma-Aldrich), and dichloromethane (0.80 L, anhydrous, EMD Chemicals, Gibbstown N.J.) in a 2-L oven-dried, three-neck flask, which was equipped with overhead stirring, and cooled with a water bath. The resulting mixture was stirred at room temperature overnight. A sample was taken for NMR analysis, which revealed that no 2,2-difluoroethanol was detected. The mixture was filtered and the filtrate was washed with 100 mL of 10% HCl, followed by two more washes with 50 mL portions of 10% HCl. A sample was taken for NMR analysis, which revealed that no pyridine was detected. The filtrate was then washed with 50 mL of 5% $Na_2CO_3$ solution, then with 100 mL of brine. The organic layer was dried over anhydrous $MgSO_4$ (50 g) for 2 h, then dried over molecular sieves (4A, 50 g) overnight. The dried solution was rotoevaporated to remove dichloromethane. The crude product obtained (208 g) was purified by spinning-band column distillation. Pure product (101.7 g) was obtained and used for the electrolyte composition.

Preparation of Nonaqueous Electrolyte Composition Comprising Methyl 2,2-Difluoroethyl Carbonate, Ethylene Carbonate and Fluoroethylene Carbonate Additive Methyl 2,2-difluoroethyl carbonate (10.0 g) was dried over 4A molecular sieves (1.0 g) overnight, then further dried over 4A molecular sieves (1.0 g) overnight. The dried methyl 2,2-difluoroethyl carbonate was then filtered with a PTFE filter plate with syringe. The filtered material (2.80 g) was mixed with ethylene carbonate (Novolyte, 1.20 g) and the resulting solvent mixture was shaken until all solid was dissolved. To a 2-mL GC vial (oven dried), was added $LiPF_6$ (0.228 g, Novolyte), followed by the addition of 1.5 mL of the solvent mixture. The net weight of the resulting mixture was 2.19 g. The mixture was shaken until all solid was dissolved. To 1.0 g of this mixture, 4-fluoro-1,3-dioxolan-2-one (10 mg, LongChem, Shanghai, China, purified by vacuum distillation) was added. The resulting nonaqueous electrolyte composition was shaken and stored in a dry-box.

Preparation of Nonaqueous Electrolyte Composition Comprising Methyl 2,2-Difluoroacetate, Ethylene Carbonate and Fluoroethylene Carbonate Additive Methyl 2,2-difluoroacetate ($HCF_2C(O)OCH_3$), obtained from SynQuest, was purified by spinning-band column distillation twice to 99.9% purity, as determined by gas chromatography using a flame ionization detector. The purified methyl 2,2-difluoroacetate (10.0 g) was dried over 4A molecular sieves (1.0 g) overnight, then further dried over 4A molecular sieves (1.0 g) overnight. The dried, purified methyl 2,2-difluoroacetate was then filtered with a PTFE filter plate with syringe. The filtered material (2.80 g) was mixed with ethylene carbonate (Novolyte, 1.20 g) and the resulting solvent mixture was shaken until all solid was dissolved. To a 2-mL GC vial (oven dried), was added $LiPF_6$ (0.228 g, Novolyte), followed by the addition of 1.5 mL of the solvent mixture. The net weight of the resulting mixture was 2.15 g. The mixture was shaken until all solid was dissolved. To 1.0 g of the mixture, 4-fluoro-1,3-dioxolan-2-one (10 mg, LongChem, Shanghai, China, purified by vacuum distillation) was added. The resulting nonaqueous electrolyte composition was shaken and stored in a dry-box.

Synthesis of 2,2,3,3-Tetrafluoropropyl Acetate ($CH_3C(O)OCH_2CF_2CF_2H$)

Under nitrogen protection, acetyl chloride (94.2 g, Sigma-Aldrich) was added slowly via syringe pump, over a period of 3 h, to 2,2,3,3-tetrafluoropropanol (132.0 g, 97%, SynQuest) in an oven-dried 0.5-L round-bottom flask, which was equipped with magnetic stirring and cooled with an ice/water bath. The flask was connected via tubing to a 10% NaOH solution trap to trap HCl gas generated (a funnel was used to avoid suction of NaOH solution back into the system). The mixture was stirred at room temperature overnight. A sample was taken for NMR analysis and 2,2,3,3-tetrafluoropropanol was detected. Acetyl chloride (0.6 g) was added to the mixture, and the mixture was stirred at room temperature for 2 h. NMR analysis showed that no 2,2,3,3-tetrafluoropropanol was present. The mixture was washed 5 times with 25 mL portions of 10% $Na_2CO_3$, then with 25 mL of water, followed by 25 mL of brine. The resulting mixture was dried over anhydrous $MgSO_4$ (20 g) overnight, then further dried twice over 5 g of 4 A molecular sieves. The resulting crude product was purified by spinning-band column distillation. Pure material (82.7 g) was obtained and used for the electrolyte composition.

Preparation of Nonaqueous Electrolyte Composition Comprising 2,2,3,3-Tetrafluoropropyl Acetate, and Ethylene Carbonate 2,2,3,3-Tetrafluoropropyl acetate (10.0 g) was dried over 4A molecular sieves (1.0 g) overnight and then filtered with a PTFE filter plate with syringe. The dried, filtered material (2.80 g) was mixed with ethylene carbonate (Novolyte, 1.20 g) and the resulting solvent mixture was shaken until all solid was dissolved. To a 2-mL GC vial (oven dried), was added $LiPF_6$ (0.076 g, Novolyte, Cleveland Ohio), followed by the addition of 1.0 mL of the solvent mixture. The net weight of the resulting mixture was 1.42 g. The mixture was shaken until all solid was dissolved. The resulting nonaqueous electrolyte composition was filtered with a PTFE filter plate with syringe and then stored in a dry-box.

Synthesis of Methyl 2,2,3,3-Tetrafluoropropyl Carbonate ($CH_3OC(O)OCH_2CF_2CF_2H$)

Under nitrogen protection, chloroformate (113.4 g, Sigma-Aldrich) was added slowly via syringe pump, over a period of 3 h, to a solution of 2,2,3,3-tetrafluoropropanol (132.0 g, 97%, SynQuest), pyridine (94.9 g, anhydrous, Sigma-Aldrich), and dichloromethane (0.80 L, anhydrous, EMD Chemicals) in an oven-dried, 2-L three-neck flask, which was equipped with overhead stirring and cooled with a water bath. The resulting mixture was stirred at room temperature overnight. A sample was taken for NMR analysis, which revealed that no 2,2,3,3-tetrafluoropropanol was detected. The mixture was filtered and the resulting filtrate was washed with 100 mL of 10% HCl, followed by 2 washes with 50 mL portions of 10% HCl. An NMR analysis revealed that pyridine was detected. The mixture was washed again with 50 mL of 10% HCl and an NMR analysis revealed that no pyridine was detected. The mixture was washed with 50 mL of 5% $Na_2CO_3$, then with 100 mL of brine. The organic layer was dried over anhydrous $MgSO_4$ (50 g) for 2 h, then molecular sieves (4A, 50 g) overnight. The dried organic layer was rotoevaporated to remove dichloromethane. The resulting crude product was purified by spinning-band column distillation. Pure material (96.0 g) was obtained and used for the electrolyte composition.

Preparation of Nonaqueous Electrolyte Composition Comprising Methyl 2,2,3,3-Tetrafluoropropyl Carbonate, and Ethylene Carbonate Methyl 2,2,3,3-tetrafluoropropyl carbonate (10.0 g) was dried over 4A molecular sieves (1.0 g) overnight. The dried methyl 2,2,3,3-tetrafluoropropyl carbonate was then filtered with a PTFE filter plate with syringe.

The dried, filtered material (2.80 g) was mixed with ethylene carbonate (Novolyte, 1.20 g) and the resulting solvent mixture was shaken until all solid was dissolved. To a 2-mL GC vial (oven-dried), was added $LiPF_6$ (0.076 g, Novolyte, Cleveland Ohio), followed by the addition of 1.0 mL of the solvent mixture. The net weight of the resulting mixture was 1.43 g. The mixture was shaken until all solid was dissolved. The resulting nonaqueous electrolyte composition was filtered with a PTFE filter plate with syringe and then stored in a dry-box.

Fabrication of $LiMn_{1.5}Ni_{0.42}Fe_{0.08}O_4$/Li Half Cells

A $LiMn_{1.5}Ni_{0.42}Fe_{0.08}O_4$ cathode, prepared as described above, a Celgard® separator 2325 (Celgard, LLC. Charlotte, N.C.), a lithium foil anode (0.75 mm in thickness) and a few drops of the nonaqueous electrolyte composition of interest were sandwiched in 2032 stainless steel coin cell cans (Hohsen Corp., Japan) to form the $LiMn_{1.5}Ni_{0.42}Fe_{0.08}O_4$/Li half cells.

Fabrication of $LiMn_{1.5}Ni_{0.42}Fe_{0.08}O_4$/$Li_4Ti_5O_{12}$ Full Cells

A $LiMn_{1.5}Ni_{0.42}Fe_{0.08}O_4$ cathode, prepared as described above, a Celgard® separator 2325 (Celgard, LLC. Charlotte, N.C.), a $Li_4Ti_5O_{12}$ anode (Farasis Energy Inc., Hayward, Calif.), and a few drops of the nonaqueous electrolyte composition of interest, were sandwiched in 2032 stainless steel coin cell cans to form the $LiMn_{1.5}Ni_{0.42}Fe_{0.08}O_4$/$Li_4Ti_5O_{12}$ full cells.

Example 1

Room Temperature Cycling Performance of $LiMn_{1.5}Ni_{0.42}Fe_{0.08}O_4$/Li Half Cell with Nonaqueous Electrolyte Composition Comprising 2,2-Difluoroethyl Acetate A $LiMn_{1.5}Ni_{0.42}Fe_{0.08}O_4$/Li half cell was prepared as described above with the nonaqueous electrolyte composition comprising 2,2-difluoroethyl acetate, prepared as described above. This $LiMn_{1.5}Ni_{0.42}Fe_{0.08}O_4$/Li half cell was cycled between 3.5 and 4.95 V at 0.2 C rate and 25° C. The cycling performance data is shown in FIG. 1. As can be seen from the figure, the $LiMn_{1.5}Ni_{0.42}Fe_{0.08}O_4$/Li half cell with the nonaqueous electrolyte composition comprising 2,2-difluoroethyl acetate had a capacity retention of 96% in 100 cycles at room temperature.

Example 2

Room Temperature Cycling Performance of $LiMn_{1.5}Ni_{0.42}Fe_{0.08}O_4$/Li Half Cell with Nonaqueous Electrolyte Composition Comprising 2,2-Difluoroethyl Acetate and Fluoroethylene Carbonate A $LiMn_{1.5}Ni_{0.42}Fe_{0.08}O_4$/Li half cell was prepared as described above with the nonaqueous electrolyte composition comprising 2,2-difluoroethyl acetate and the fluoroethylene carbonate additive, prepared as described above. This $LiMn_{1.5}Ni_{0.42}Fe_{0.08}O_4$/Li half cell was cycled between 3.5 and 4.95 V at 0.2 C rate and 25° C.

Figure 2:
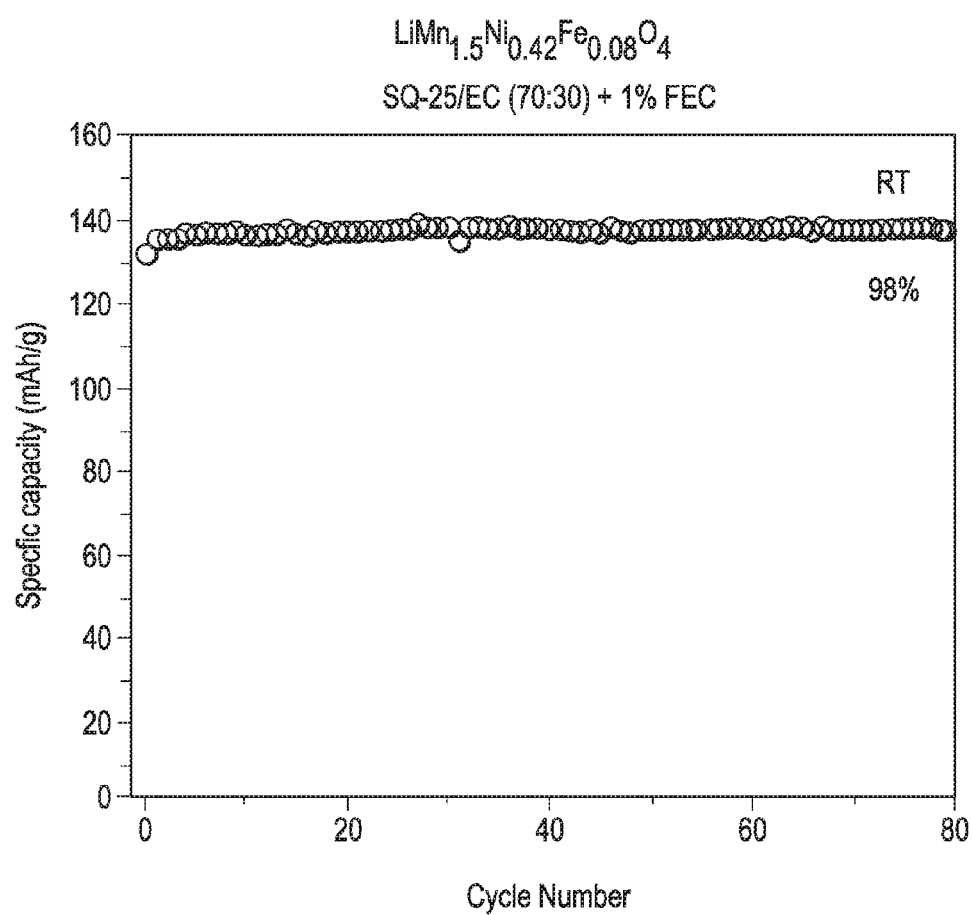

The cycling performance data is shown in FIG. 2. As can be see from the figure, the $LiMn_{1.5}Ni_{0.42}Fe_{0.08}O_4$/Li half cell with the nonaqueous electrolyte composition comprising 2,2-difluoroethyl acetate and the fluoroethylene carbonate additive had a capacity retention of 98% in 80 cycles at room temperature.

Example 3, Comparative

Room Temperature Cycling Performance of $LiMn_{1.5}Ni_{0.42}Fe_{0.08}O_4$/Li Half Cell with Standard EC/EMC Electrolyte A $LiMn_{1.5}Ni_{0.42}Fe_{0.08}O_4$/Li half cell was prepared as described above using a standard electrolyte containing ethyl carbonate (EC)/ethyl methyl carbonate (EMC) in a volume ratio of 30:70 and 1 M $LiPF_6$ (Novolyte, Cleveland, Ohio). This half cell was cycled between 3.5 and 4.95 V at 0.2 C rate and 25° C.

Figure 3:
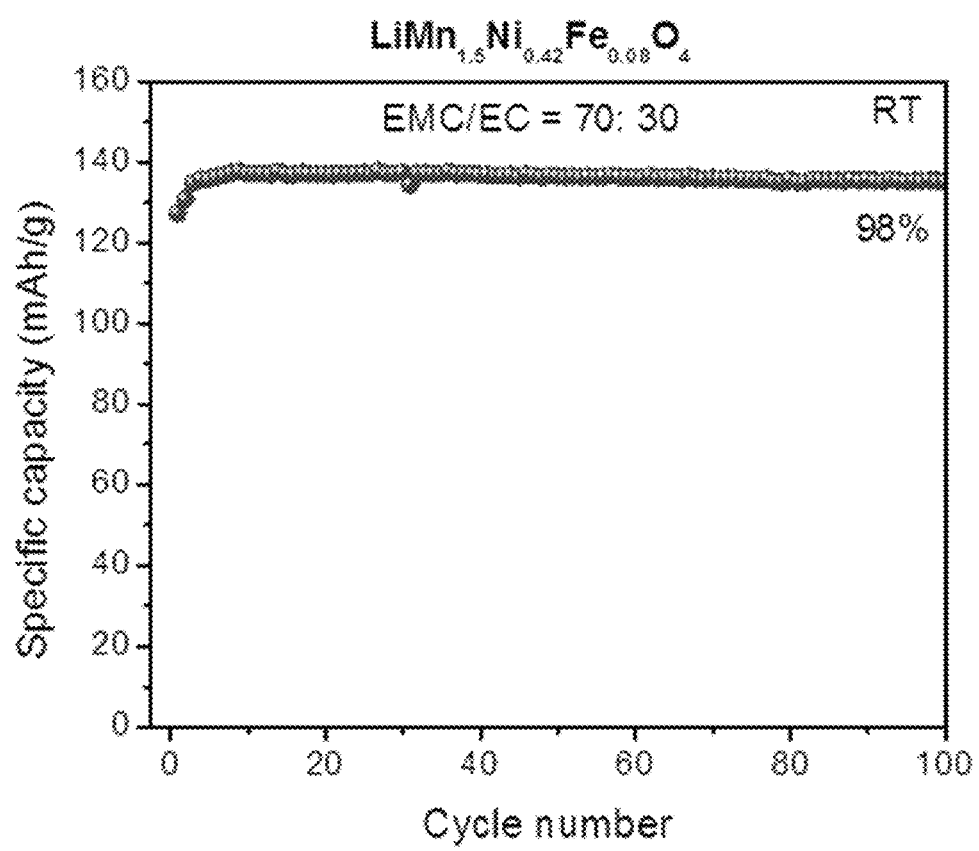

The cycling performance data is shown in FIG. 3. As can be seen from the figure, the $LiMn_{1.5}Ni_{0.42}Fe_{0.08}O_4$/Li half cell with the standard EC/EMC electrolyte had a capacity retention of 98% in 100 cycles at room temperature.

Example 4

High Temperature Cycling Performance of $LiMn_{1.5}Ni_{0.42}Fe_{0.08}O_4$/Li Half Cell with Nonaqueous Electrolyte Composition Comprising 2,2-Difluoroethyl Acetate A $LiMn_{1.5}Ni_{0.42}Fe_{0.08}O_4$/Li half cell was prepared as described above with the nonaqueous electrolyte composition comprising 2,2-difluoroethyl acetate. This $LiMn_{1.5}Ni_{0.42}Fe_{0.08}O_4$/Li half cell was cycled between 3.5 and 4.95 V at 0.5 C rate and 55° C.

Figure 4:
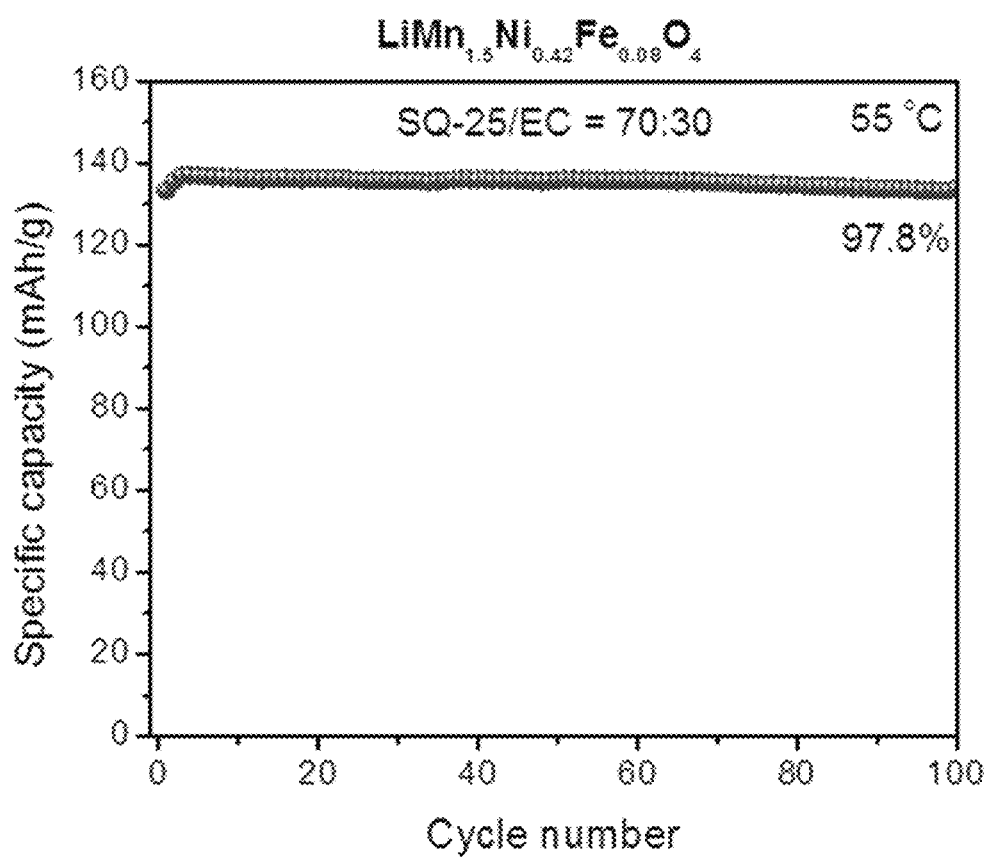

The cycling performance data is shown in FIG. 4. As can be seen from the figure, the $LiMn_{1.5}Ni_{0.42}Fe_{0.08}O_4$/Li half cell with the nonaqueous electrolyte composition comprising 2,2-difluoroethyl acetate had a capacity retention of 97% in 100 cycles at 55° C.

Example 5

High Temperature Cycling Performance of $LiMn_{1.5}Ni_{0.42}Fe_{0.08}O_4$/Li Half Cell with Nonaqueous Electrolyte Composition Comprising 2,2-Difluoroethyl Acetate and Fluoroethylene Carbonate A $LiMn_{1.5}Ni_{0.42}Fe_{0.42}O_4$/Li half cell was prepared as described above with the nonaqueous electrolyte composition comprising 2,2-difluoroethyl acetate and the fluoroethylene carbonate additive. This $LiMn_{1.5}Ni_{0.42}Fe_{0.08}O_4/Li$ half cell was cycled between 3.5 and 4.95 V at 0.5 C rate and 55° C.

Figure 5:
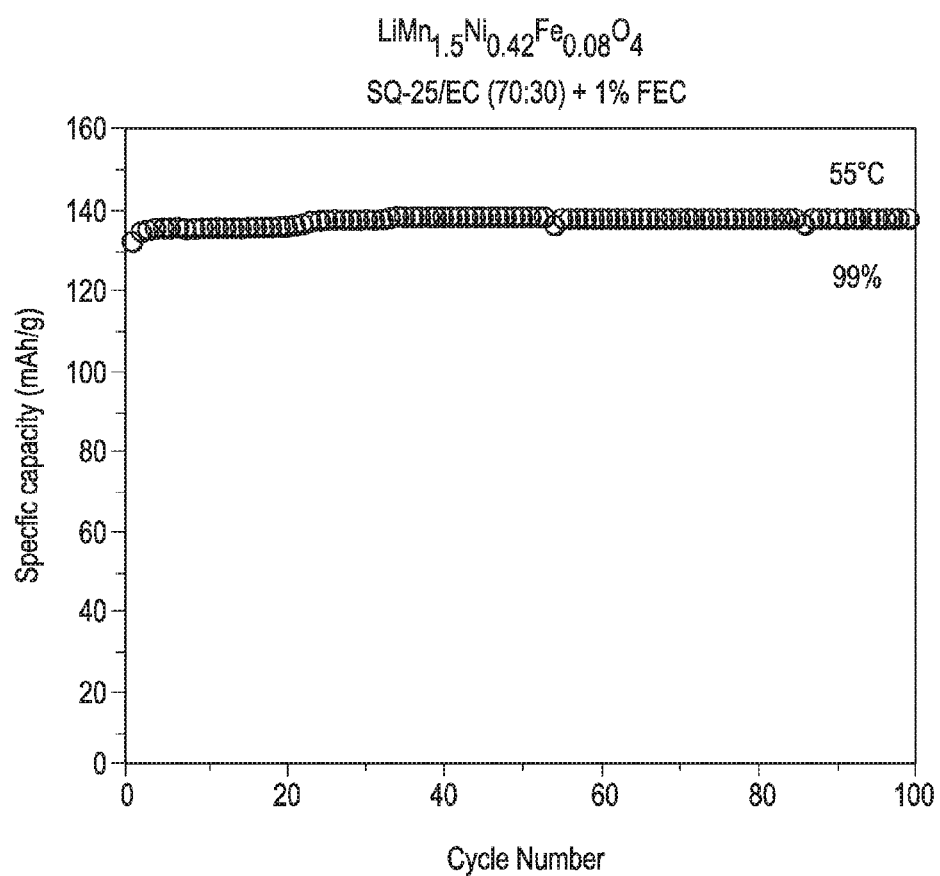

The cycling performance data is shown in FIG. 5. As can be seen from the figure, the $LiMn_{1.5}Ni_{0.42}Fe_{0.08}O_4/Li$ half cell with the nonaqueous electrolyte composition comprising 2,2-difluoroethyl acetate and the fluoroethylene carbonate additive had a capacity retention of 99% in 100 cycles at 55° C.

Example 6, Comparative

High Temperature Cycling Performance of $LiMn_{1.5}Ni_{0.42}Fe_{0.08}O_4/Li$ Half Cell with Standard EC/EMC Electrolyte A $LiMn_{1.5}Ni_{0.42}Fe_{0.08}O_4/Li$ half cell was prepared as described above with standard EC/EMC electrolyte. This $LiMn_{1.5}Ni_{0.42}Fe_{0.08}O_4/Li$ half cell was cycled between 3.5 and 4.95 V at 0.5 C rate and 55° C.

Figure 6:
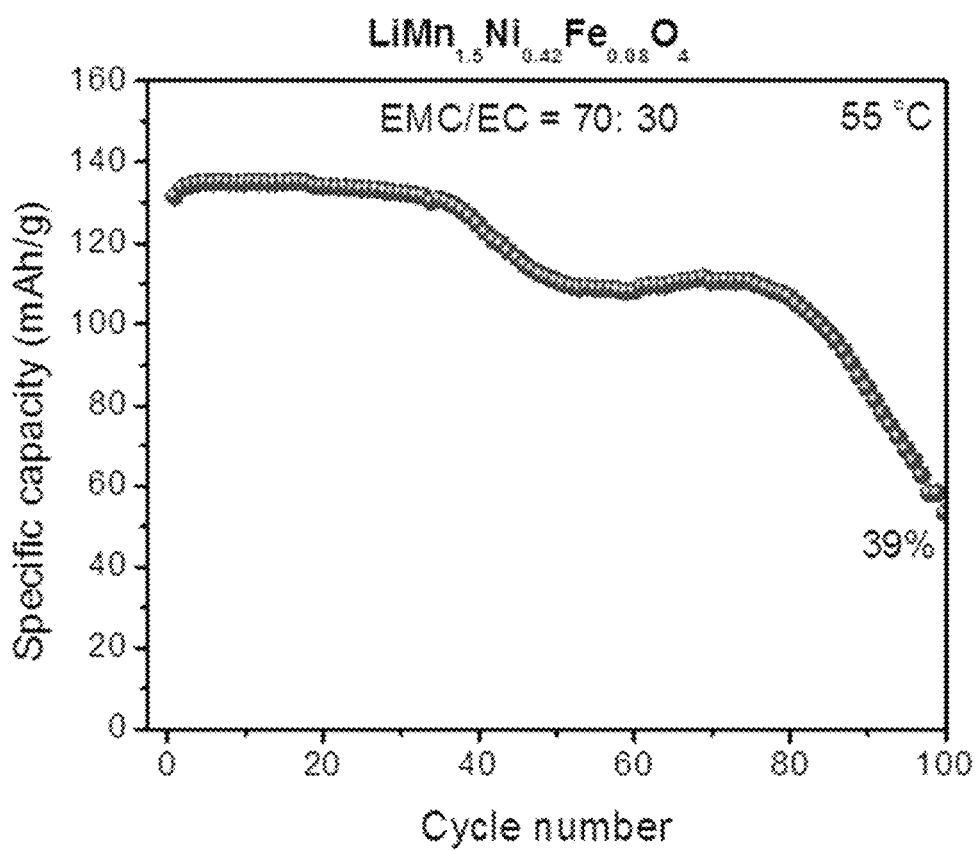

The cycling performance data is shown in FIG. 6. As can be seen from the figure, the $LiMn_{1.5}Ni_{0.42}Fe_{0.08}O_4/Li$ half cell with the standard EC/EMC electrolyte had a capacity retention of only 39% in 100 cycles at 55° C.

Example 7

Electrochemical Impedance Spectroscopy of $LiMn_{1.5}Ni_{0.42}Fe_{0.08}O_4/Li$ Half Cells with Various Electrolytes Electrochemical impedance spectroscopy (EIS) studies of $LiMn_{1.5}Ni_{0.42}Fe_{0.08}O_4/Li$ half cells with different electrolytes (see Table 1) were done at 100% SOC (i.e. fully charged) after 100 cycles at 55° C. The frequency ranged from $10^5$ Hz to $10^{-3}$ Hz. The AC voltage amplitude was 10 mV.

Figure 7A:
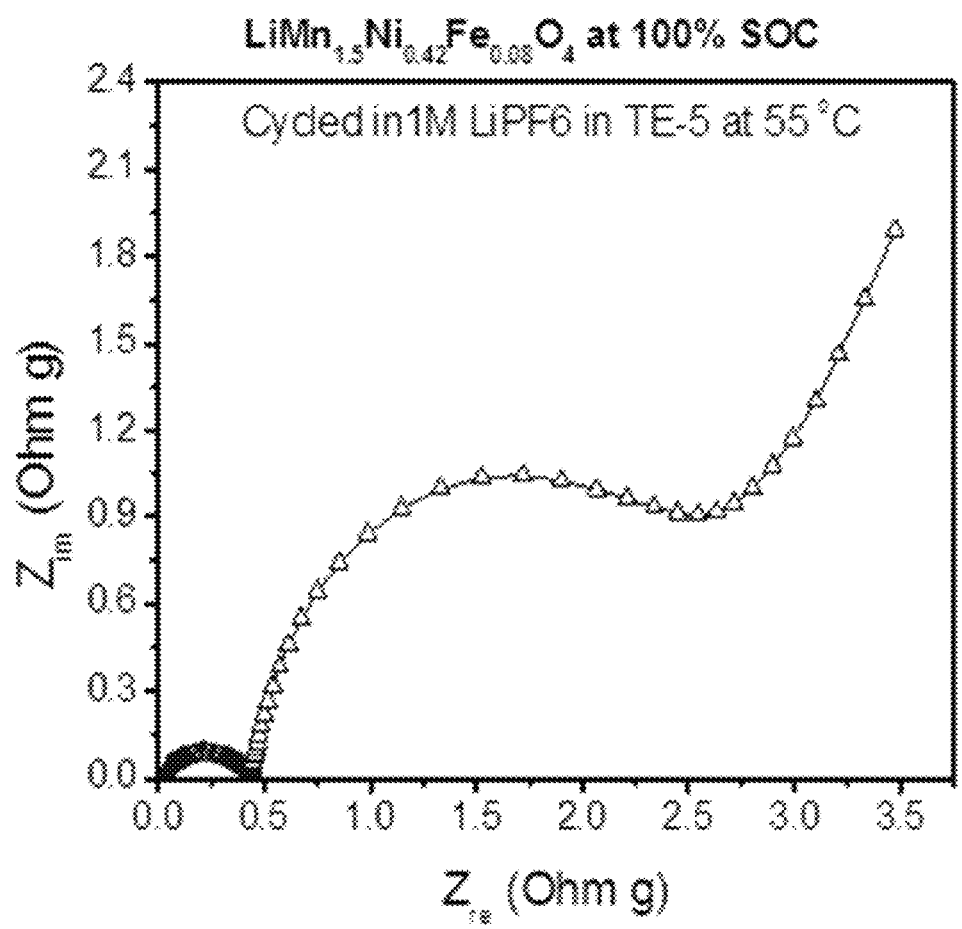
Figure 7B:
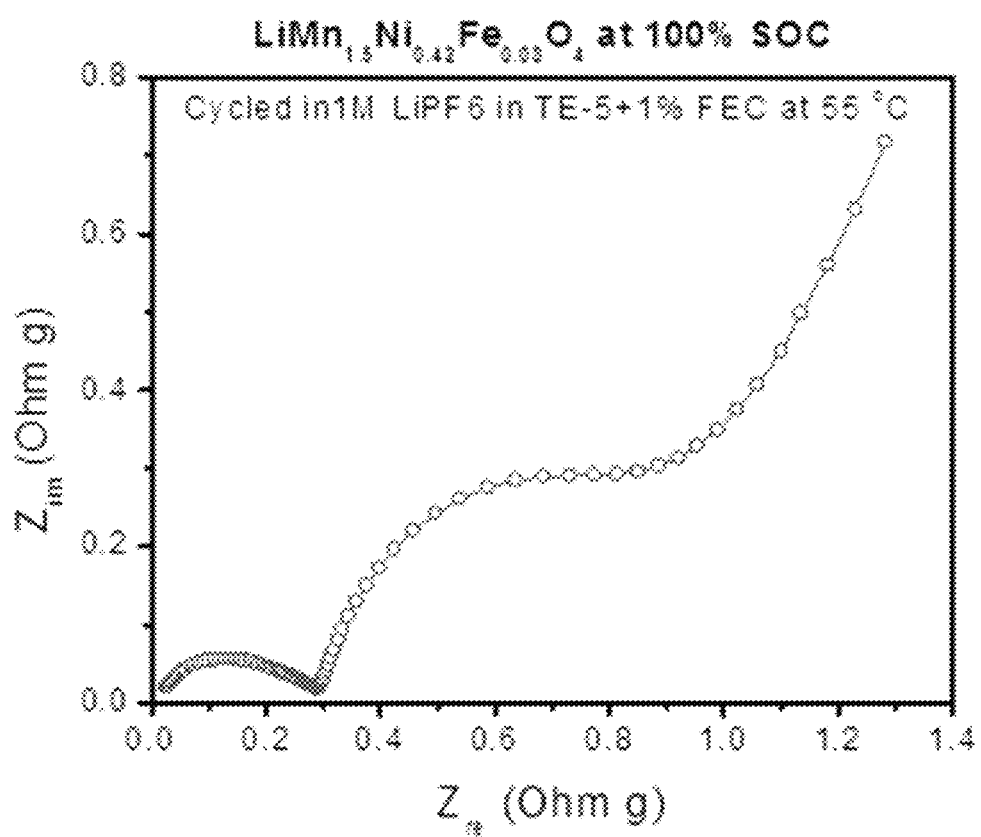
Figure 7C:
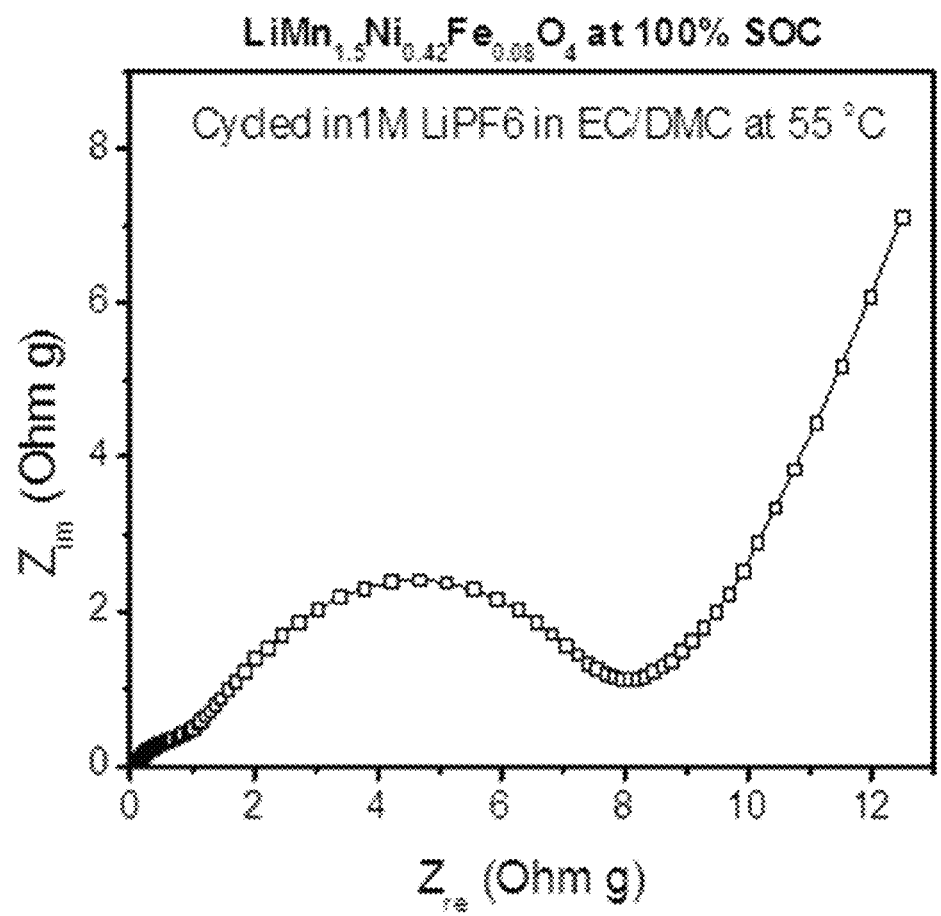

The resulting EIS spectra are shown in FIG. 7a (Example 4 half cell), 7b (Example 5 half cell), and 7c (Example 6, Comparative half cell), and the results are summarized in Table 1. As can be seen from the data in the table, the SEI resistances (Rs) and the charge transfer resistances (Rct) were significantly lower for the half cells with the nonaqueous electrolyte composition comprising 2,2-difluoroethyl acetate (Example 4 half cell) and with the nonaqueous electrolyte composition comprising 2,2-difluoroethyl acetate and the fluoroethylene carbonate additive (Example 5 half cell) than with the half cell with the standard EC/EMC electrolyte (Example 6, Comparative, half cell). These results indicate that the nonaqueous electrolyte compositions containing the fluorinated components suppressed SEI development and significantly improved surface charge transfer kinetics at elevated temperature (55° C.).

TABLE 1

Results of EIS Of $LiMn_{1.5}Ni_{0.42}Fe_{0.08}O_4/Li$ Half Cells

| $LiMn_{1.5}Ni_{0.42}Fe_{0.08}O_4/Li$ Half Cell | Rs (ohm g) | Rct (ohm g) |
|---|---|---|
| Example 4 | 0.45 | 2.4 |
| Example 5 | 0.30 | 0.9 |
| Example 6, Comparative | 1.0 | 7.3 |

Example 8

High Temperature Cycling Performance of $LiMn_{1.5}Ni_{0.42}Fe_{0.08}O_4/Li_4Ti_5O_{12}$ Full Cell with Nonaqueous Electrolyte Composition Comprising 2,2-Difluoroethyl Acetate and Fluoroethylene Carbonate A $LiMn_{1.5}Ni_{0.42}Fe_{0.08}O_4/Li_4Ti_5O_{12}$ full cell was prepared as described above with the nonaqueous electrolyte composition comprising 2,2-difluoroethyl acetate and the fluoroethylene carbonate additive. This $LiMn_{1.5}Ni_{0.42}Fe_{0.08}O_4/Li_4Ti_5O_{12}$ full cell was cycled between 1.95 and 3.4 V at 0.5 C rate and 55° C.

Figure 8:
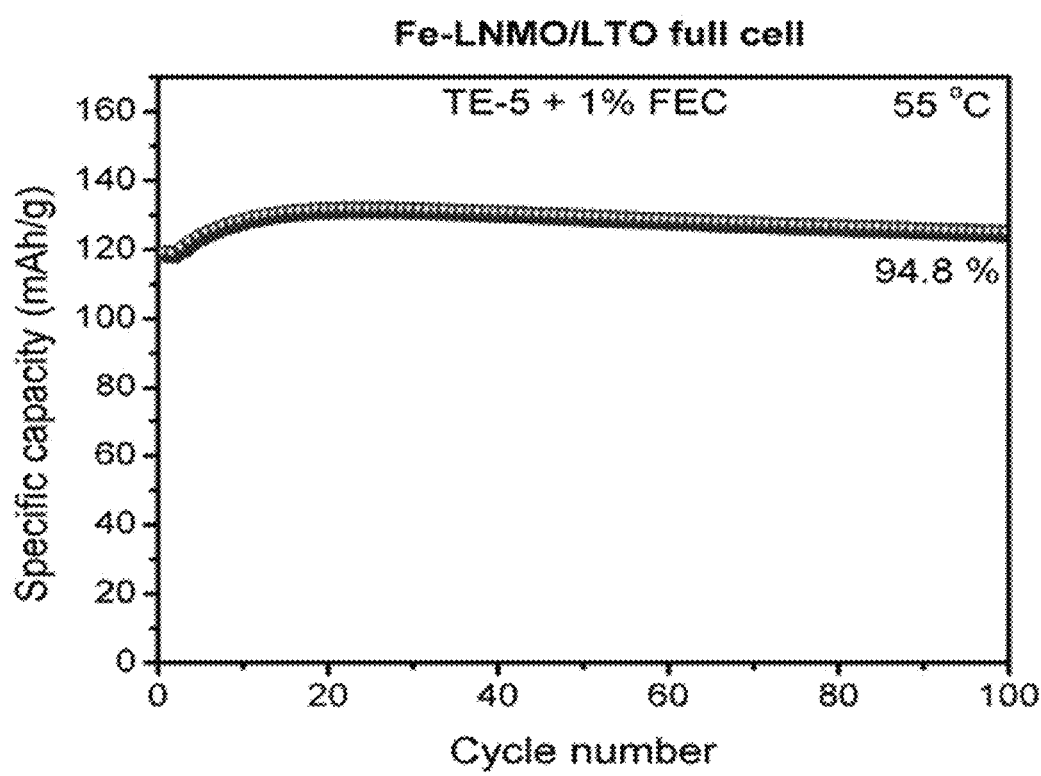

The cycling performance is shown in FIG. 8. As can be seen in the figure, this $LiMn_{1.5}Ni_{0.42}Fe_{0.08}O_4/Li_4Ti_5O_{12}$ full cell had a capacity retention of 94.8% in 100 cycles at 55° C.

Example 9, Comparative

High Temperature Cycling Performance of $LiMn_{1.5}Ni_{0.5}O_4/Li_4Ti_5O_{12}$ Full Cell with Nonaqueous Electrolyte Composition Comprising 2,2-Difluoroethyl Acetate and Fluoroethylene Carbonate A $LiMn_{1.5}Ni_{0.5}O_4/Li_4Ti_5O_{12}$ full cell was prepared as described above with the nonaqueous electrolyte composition comprising 2,2-difluoroethyl acetate and the fluoroethylene carbonate additive. This $LiMn_{1.5}Ni_{0.5}O_4/Li_4Ti_5O_{12}$ full cell was cycled between 1.95 and 3.4 V at 0.5 C rate and 55° C.

Example 10

High Temperature Cycling Performance of $LiMn_{1.5}Ni_{0.42}Fe_{0.08}O_4/Li$ Half Cell with Nonaqueous Electrolyte Composition Comprising $CH_3OCO_2CH_2CF_2H$:EC (70:30) and Fluoroethylene Carbonate A $LiMn_{1.5}Ni_{0.42}Fe_{0.08}O_4/Li$ half cell was prepared as described above using the nonaqueous electrolyte composition comprising $CH_3OCO_2CH_2CF_2H$:EC (70:30) and the fluoroethylene carbonate additive (1%). This $LiMn_{1.5}Ni_{0.42}Fe_{0.08}O_4/Li$ half cell was cycled at 60 mA/g at 55° C. between 3.5 V and 4.95 V.

Figure 10:
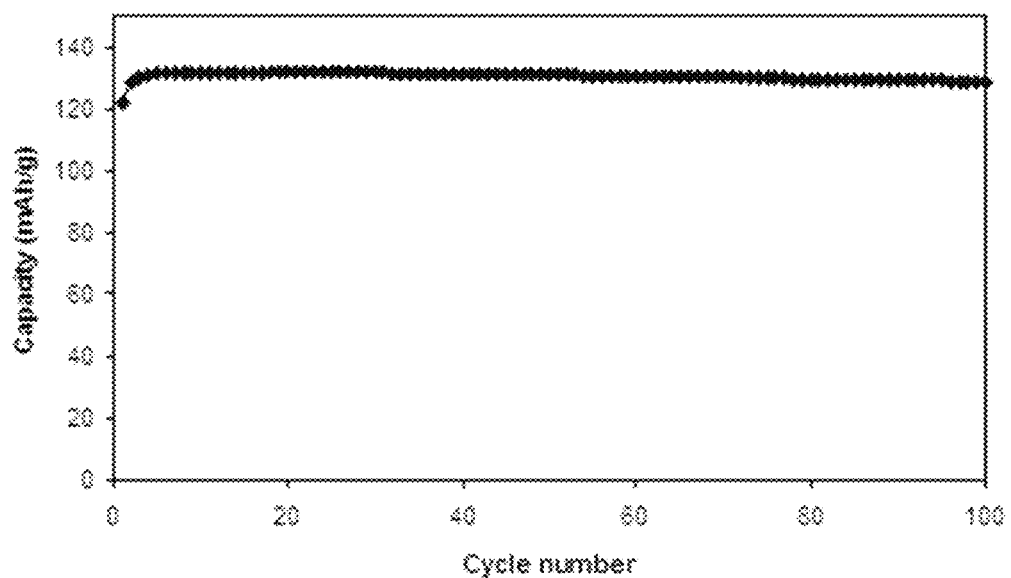
Figure 11:
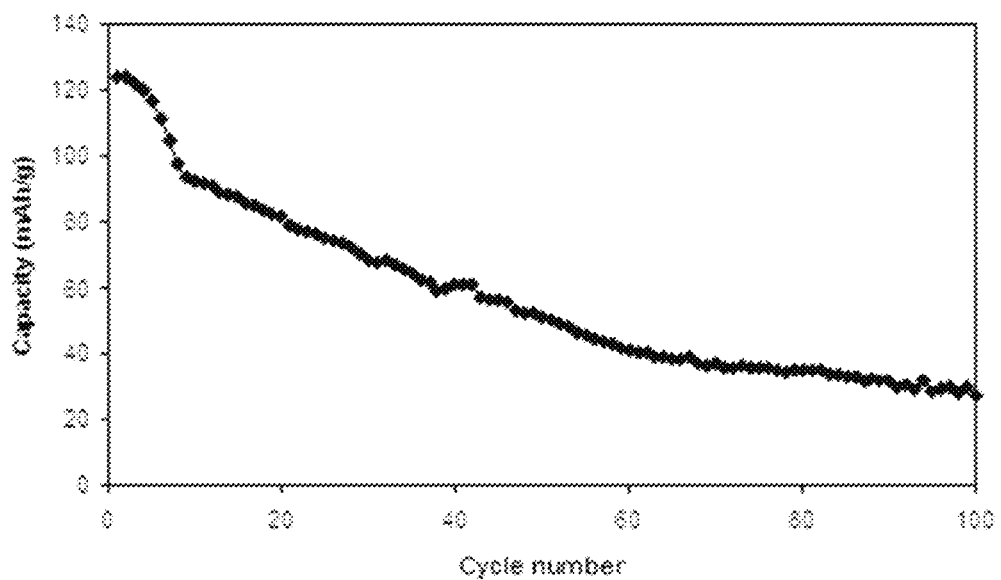

The cycling performance data is shown in FIG. 10. The capacity retention was as high as 98% in 100 cycles at 55° C., indicating that the cathode/fluorinated electrolyte combination has a very good high temperature cycling performance.

Example 11, Comparative

High Temperature Cycling Performance of $LiMn_{1.5}Ni_{0.42}Fe_{0.08}O_4/Li$ Half Cell with Nonaqueous Electrolyte Composition Comprising $CF_2HCO_2CH_3$:EC (70:30) and Fluoroethylene Carbonate A $LiMn_{1.5}Ni_{0.42}Fe_{0.08}O_4/Li$ half cell was prepared as described above using the nonaqueous electrolyte composition comprising $CF_2HCO_2CH_3$:EC (70:30) and the fluoroethylene carbonate additive (1%). This $LiMn_{1.5}Ni_{0.42}Fe_{0.08}O_4/Li$ half cell was cycled at 60 mA/g at 55° C. between 3.5 V and 4.95 V.

Figure 9:
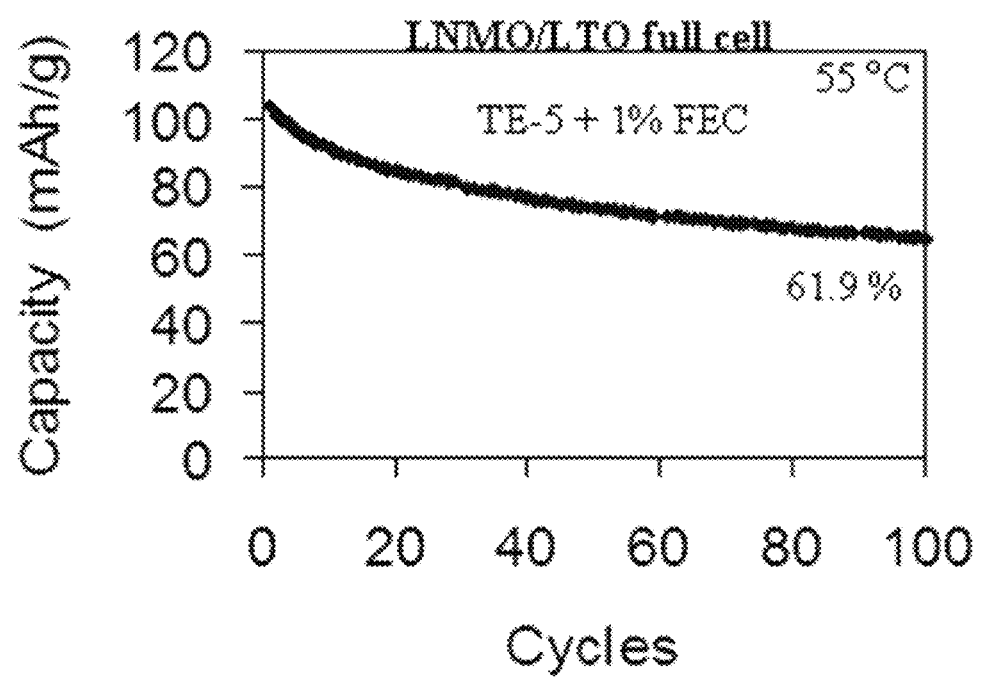

The cycling performance is shown in FIG. 9. As can be seen in the figure, only 61.9% capacity retention was observed in 100 cycles for the $LiMn_{1.5}Ni_{0.5}O_4/Li_4Ti_5O_{12}$ full cell with this electrolyte at 55° C.

Examples 12-22

High Temperature Cycling Performance of $LiMn_{1.5}Ni_{0.42}Fe_{0.08}O_4/Li_4Ti_5O_{12}$ Full Cells with Nonaqueous Electrolyte Compositions Comprising Various Fluorinated Solvents Preparation of $LiMn_{1.5}Ni_{0.42}Fe_{0.08}O_4$ Cathode Active Material Iron-doped $LiMn_{1.5}Ni_{0.5}O_4$ was synthesized by the hydroxide precursor method described by Liu et al (*J. Phys. Chem. C* 113, 15073-15079, 2009). For this preparation, 401 g of manganese (II) acetate tetrahydrate (Sigma-Aldrich), 115 g of nickel (II) acetate tetrahydrate (Sigma-Aldrich) and 15.2 g of iron (II) acetate anhydrous (Alfa Aesar, Ward Hill, Mass.) were weighed on a balance then dissolved in 5 L of deionized water to prepare the acetate solution. KOH pellets were dissolved in 10 L of deionized water in a 30-L reactor to produce a 3.0 M solution. The acetate solution was transferred to an addition funnel and dripped rapidly into the stirred reactor to precipitate the mixed hydroxide material. Once all 5 L of the acetate solution was added to the reactor, stirring was continued for 1 h. Then, stirring was stopped and the hydroxide precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids collected were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate filter cake was then ground and mixed with lithium carbonate. This step was done in 60 g batches using a Fritsch Pulverisette automated mortar and pestle (Fritsch USA, Goshen, N.Y.). For each batch, the hydroxide precipitate was weighed, then ground alone for 5 min in the Pulveresette. Then, a stoichiometric amount plus a small excess of lithium carbonate was added to the system. For 53 g of hydroxide, 11.2 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

Preparation of $LiMn_{1.5}Ni_{0.42}Fe_{0.08}O_4$ Cathode $LiMn_{1.5}Ni_{0.42}Fe_{0.08}O_4$ spinel cathode material, prepared as described above, was used to prepare the cathode. The binder was obtained as a 12% solution of polyvinylidene fluoride in NMP (KFL #1120, Kureha America Corp, New York, N.Y.). Carbon black (0.260 g, acetylene black, Denka Corp. New York, N.Y., uncompressed), 3.88 g of NMP, and the PVDF solution (2.16 g) were combined in a 15 mL vial with a fluoropolymer cap and centrifugally mixed 3 times for 1 min each at 2,000 rpm using a THINKY ARE-310 centrifuge (THINKY Corp., Japan). The cathode material (2.08 g) was ground using a mortar and pestle for approximately one hour. The cathode material and 0.70 g of NMP were then added to the vial and the mixture was again centrifugally mixed 3 times for 1 min each at 2000 rpm to form a cathode paste. The total weight of the paste was 9.08 g (28.6% solids). The vial was mounted in an ice bath and homogenized twice using a rotor-stator (Model PT 10-35 GT, 7.5 mm dia. stator, Kinematicia, Bohemia N.Y.) for 15 min each at 6500 rpm and then twice more for 15 min each at 9500 rpm. Between each of the four homogenization periods, the homogenizer was moved to another position in the paste vial. The paste was cast onto untreated aluminum foil using a doctor blade with a 0.25 mm gate height and dried in a vacuum oven at 100° C. for 15 min. The resulting 50-mm wide cathode was placed on a 125 µm thick brass sheet and two 38 mm wide brass shim strips of 37 µm thickness were placed on either side of the cathode to help control the gap thickness in the calendar. The cathode and shims were covered with a second 125 µm thick brass sheet, and the assembly was passed through a calendar twice using 100 mm diameter steel rolls at ambient temperature with nip forces of 560 and then 680 kg, respectively. The average cathode thickness was reduced from 67 µm before calendaring to 45 µm. Additional cathodes were prepared in a similar manner, except the gate height of the doctor blade was increased to 0.29 mm and the cathodes were dried.

Preparation of Lithium Titanate Anode

Carbon black (0.39 g, acetylene black, Denka Corp., New York N.Y., uncompressed), PVDF solution (3.00 g, 13% in NMP, KFL #9130, Kureha America Corp, New York N.Y.), and 6.03 g of NMP were combined and centrifugally mixed three times for 60 s each time at 2000 rpm. $Li_4Ti_5O_{12}$ powder (3.12 g, Nanomyte BE-10, NEI Corporation, Somerset, N.J.) and an additional 1.10 g of NMP were added to the carbon black and PVDF mixture, and the resulting paste was centrifugally mixed three times for 60 s each at 2000 rpm. The vial was mounted in an ice bath and homogenized twice using a rotor-stator for 15 min each at 6500 rpm and then twice more for 15 min each at 9500 rpm. The paste was placed in a mortar and manually ground briefly with a pestle to further remove aggregates. Then, the paste was cast using a doctor blade with a 0.29 mm gate height onto untreated 25 µm thick aluminum foil. The paste was dried in a convection oven (model FDL-115, Binder Inc., Great River, N.Y.) at 100° C. for 15 min. The thickness of the anode was 71 µm. The resulting 50-mm wide anode was calendared in a manner similar to the cathode described above. The average anode thickness was reduced from 71 µm before calendaring to 53 µm after calendaring.

Fabrication of $LiMn_{1.5}Ni_{0.42}Fe_{0.08}O_4/Li_4Ti_5O_{12}$ Full Cells

Nonaqueous electrolyte lithium-ion CR2032 coin cells were prepared for electrochemical evaluation. Circular anodes and cathodes were punched out, placed in a heater in the antechamber of a glove box, further dried under vacuum overnight at 100° C., and brought into an argon glove box (Vacuum Atmospheres, Hawthorne Calif., with HE-493 purifier). The electrode diameters were a 14.1 mm cathode used with a 16.0 mm anode, or a 10.1 mm cathode used with a 12.3 mm anode. All the cells were cathode limited, with a ratio of the lithium titanate weight to the Fe-LNMO weight greater than 1.0 for all the cells. The coin cell parts (case, spacers, wave spring, gasket, and lid) and coin cell crimper were obtained from Hohsen Corp (Osaka, Japan). The separator used was a 25 μm thick microporous polyolefin separator (CG2325, Celgard, Charlotte, N.C.). The electrolyte used in each of the Examples is given in Table 2.

High Temperature Cycling of $LiMn_{1.5}Ni_{0.42}Fe_{0.08}O_4/Li_4Ti_5O_{12}$ Full Cells The $LiMn_{1.5}Ni_{0.42}Fe_{0.08}O_4/Li_4Ti_5O_{12}$ full cells were cycled using a commercial battery tester (Series 4000, Maccor, Tulsa, Okla.) at 55° C. using voltage limits of 1.9 and 3.4 V. The first 29 cycles were performed using constant current charging and discharging at a rate of 60 mA per gram of Fe-LNMO. In the $30^{th}$ cycle, the rate was reduced to 24 mA/g. This set of 30 cycles (29+1) was repeated 10 times for a total of 300 cycles. The number of cycles before the discharge capacity was reduced to 80% of the initial discharge capacity in the first cycle is shown in Table 1. The average of the specific discharge capacity remaining in cycles 297-299 is also shown in Table 2.

TABLE 2

Results of High Temperature Cycling of $LiMn_{1.5}Ni_{0.42}Fe_{0.08}O_4/Li_4Ti_5O_{12}$ Full Cells

| Example | Electrolyte | Cycle Life 80% Retention | Specific Capacity after 298 cycles mAh/g of cathode active |
|---|---|---|---|
| 12 | $CH_3OC(O)OCH_2CF_3$:EC:FEC | 102 | 80 |
| 13 | 69:30:1, 0.5M $LiPF_6$ | 111 | 84 |
| 14 | $CH_3C(O)OCH_2CF_3$:EC:FEC | 101 | 25 |
| 15 | 69:30:1, 0.5M $LiPF_6$ | 182 | 89 |
| 16 | $CH_3OC(O)OCH_2CF_2H$:EC:FEC 69:30:1, 1.0M $LiPF_6$ | 96 | 40 |
| 17, Comparative | $HCF_2C(O)OCH_3$:EC:FEC 69:30:1, 1.0M $LiPF_6$ | 2 | 3 |
| 18, Comparative | | 2 | 7 |
| 19 | $CH_3C(O)OCH_2CF_2CF_2H$:EC | 178 | 84 |
| 20 | 70:30, 0.5M $LiPF_6$ | 69 | 38 |
| 21 | $CH_3OC(O)OCH_2CF_2CF_2H$:EC 70:30, 0.5M $LiPF_6$ | 16 | 28 |
| 22 | | 24 | 11 |

In various embodiments of the lithium ion battery hereof, pairs of dopant metals and fluorinated solvents may be formed from (i) any one or more of all of the members of the total group of dopant metals disclosed herein (Al, Cr, Fe, Ga, Zn, Co, Nb, Mo, Ti, Zr, Mg, V and Cu), selected as described above as a single member or any subgroup of any size taken from the total group of doping metals in all the various different combinations of individual members of that total group, together with (ii) any one or more of all of the members of the total group of Formula IIA, IIB or Formula III fluorinated solvents disclosed herein, selected as described above as a single member or any subgroup of any size taken from the total group of those fluorinated solvents in all the various different combinations of individual members of that total group. Subgroups of the members of the groups of dopant metals or fluorinated solvents may be formed by omitting any one or more members from the respective whole groups as set forth above. As a result, the dopant metal or fluorinated solvent (or pair thereof) may not only be the members of any subgroup of any size that may be formed from the whole group from all the various different combinations of individual members of the groups as set forth in the list above, but may also be made in the absence of the members that have been omitted from the whole group to form the subgroup. The subgroup formed by omitting various members from the whole group in the lists above may, moreover, be an individual member of the whole group such that the dopant metal or fluorinated solvent (or pair thereof) may be selected in the absence of all other members of the whole group except the selected individual member.

Formulae IIA, IIB and III shown herein describes each and all of the separate, individual fluorinated solvent compounds that can be assembled in each of the formulae by (1) selection from within the prescribed range for one of the variable radicals, substituents or numerical coefficients while all of the other variable radicals, substituents or numerical coefficients are held constant, and (2) performing in turn the same selection from within the prescribed range for each of the other variable radicals, substituents or numerical coefficients with the others being held constant. In addition to a selection made within the prescribed range for any of the variable radicals, substituents or numerical coefficients of only one of the members of the group described by the range, a plurality of compounds may be described by selecting more than one but less than all of the members of the whole group of radicals, substituents or numerical coefficients. When the selection made within the prescribed range for any of the variable radicals, substituents or numerical coefficients is a subgroup containing (i) only one of the members of the whole group described by the range, or (ii) more than one but less than all of the members of the whole group, the selected member(s) are selected by omitting those member(s) of the whole group that are not selected to form the subgroup. The compound, or plurality of compounds, may in such event be characterized by a definition of one or more of the variable radicals, substituents or numerical coefficients that refers to the whole group of the prescribed range for that variable but where the member(s) omitted to form the subgroup are absent from the whole group.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, (a) lists of compounds, monomers, oligomers, polymers and/or other chemical materials include derivatives of the members of the list in addition to mixtures of two or more of any of the members and/or any of their respective derivatives; and (b) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value.

What is claimed is:

1. A lithium ion battery comprising:
(a) a housing;
(b) an anode and a cathode disposed in the housing and in conductive contact with one another, wherein the cathode is a manganese cathode comprising a lithium-containing manganese composite oxide having a spinel structure as active material, the lithium-containing manganese composite oxide being represented by the formula $Li_zMn_{1.5}Ni_xM_yO_{4-d}$, wherein
M is at least one metal selected from the group consisting of Al, Cr, Fe, Ga, Zn, Co, Nb, Mo, Ti, Zr, Mg, V and Cu,
$0.38 \leq x < 0.5$,
$0 < y \leq 0.12$,
$0 \leq d \leq 0.3$,
$0.00 < z \leq 1.1$, and z changes in accordance with release and uptake of lithium ions and electrons during charge and discharge;
(c) a nonaqueous electrolyte composition disposed in the housing and providing an ionically conductive pathway between the anode and the cathode, wherein the nonaqueous electrolyte composition comprises:
at least one electrolyte salt;
at least one fluorinated acyclic carboxylic acid ester; and
one or more additives selected from the group consisting of fluoroethylene carbonate and its derivatives, wherein the one or more additives are in an amount ranging from 0.01% to 5% by weight of the nonaqueous electrolyte composition; and
(d) a porous separator between the anode and the cathode.

2. The lithium ion battery of claim 1 wherein M is at least one metal selected from the group consisting of Al, Cr, Fe, Ga and Zn,
$0.4 \leq x < 0.5$,
$0 < y \leq 0.1$,
$z = 1$ and
$d = 0$.

3. The lithium ion battery of claim 1 wherein the fluorinated acyclic carboxylic acid ester is selected from one or more members of the group consisting of $CH_3C(O)OCH_2CF_2H$, $CH_3C(O)OCH_2CF_3$, and $CH_3C(O)OCH_2CF_2CF_2H$.

4. The lithium ion battery of claim 1, further comprising a fluorinated acyclic carbonate.

5. The lithium ion battery of claim 1 wherein M in the formula of (b) comprises Fe.

6. The lithium ion battery of claim 3 wherein the fluorinated acyclic carboxylic acid ester comprises $CH_3CO_2CH_2CF_2H$.

7. The lithium ion battery of claim 1 wherein the nonaqueous electrolyte composition (c) comprises a solvent mixture comprising a fluorinated acyclic carboxylic acid ester and at least one co-solvent.

8. The lithium ion battery of claim 7 wherein the solvent mixture comprises a fluorinated acyclic carboxylic acid ester at about 50% to about 80% by weight of the solvent mixture.

9. The lithium ion battery of claim 7 wherein the solvent mixture comprises a fluorinated acyclic carboxylic acid ester at about 65% to about 75% by weight of the solvent mixture.

10. The lithium ion battery of claim 7 wherein the co-solvent comprises ethylene carbonate.

11. The lithium ion battery of claim 7 wherein the solvent mixture comprises $CH_3CO_2CH_2CF_2H$ and ethylene carbonate.

12. The lithium ion battery of claim 11 wherein $CH_3CO_2CH_2CF_2H$ comprises about 50% to about 80% by weight of the solvent mixture.

13. The lithium ion battery of claim 11 wherein $CH_3CO_2CH_2CF_2H$ comprises about 65% to about 75% by weight of the solvent mixture.

14. The lithium ion battery of claim 1 wherein the nonaqueous electrolyte composition (c) further comprises a non-FEC additive selected from the group consisting of ethylene sulfate and its derivatives, vinyl ethylene carbonate and its derivatives, vinylene carbonate and its derivatives, maleic anhydride and its derivatives, and vinyl acetate.

15. The lithium ion battery of claim 1 wherein the one or more additives comprises fluoroethylene carbonate.

16. The lithium ion battery of claim 4 wherein a fluorinated acyclic carboxylic acid ester is represented by the following structural formula:

$R^1$—$C(O)$—$R^2$, wherein $R^1$ is selected from the group consisting of $CH_3$, $CH_2CH_3$, $CH_2CH_2CH_3$, $CH(CH_3)_2$, $CF_3$, $CF_2H$, $CFH_2$, $CF_2R^3$, $CFHR^3$ and $CH^2R^f$, wherein $R_2$ is independently selected from the group consisting of $CH_3$, $CH_2CH_3$, $CH_2CH_2CH_3$, $CH(CH_3)_2$ and $CH_2R^f$, wherein $R^3$ is a $C_1$ to $C_3$ alkyl group which is optionally substituted with at least one fluorine, wherein $R^f$ is a $C_1$ to $C_3$ alkyl group substituted with at least one fluorine, and wherein at least one of $R^1$ or $R^2$ contains at least one fluorine and when $R^1$ is $CF_2H$, $R^2$ is not $CH_3$, and a fluorinated acyclic carbonate is represented by the following structural formula:

$R^4$—$O$—$C(O)O$—$R^5$, wherein $R^4$ and $R^5$ are independently selected from the group consisting of $CH_3$, $CH_2CH_3$, $CH_2CH_2CH_3$, $CH(CH_3)_2$ and $CH_2R^f$, wherein $R^f$ is a $C_1$ to $C_3$ alkyl group substituted with at least one fluorine, and wherein at least one of $R^4$ or $R^5$ contains at least one fluorine.

17. The lithium ion battery of claim 1 wherein the electrolyte salt in the nonaqueous electrolyte composition (c) is selected from one or more members of the group consisting of:
lithium hexafluorophosphate,
$LiPF_3(CF_2CF_3)_3$,
lithium bis(trifluoromethanesulfonyl)imide,
lithium bis (perfluoroethanesulfonyl)imide, lithium (fluorosulfonyl)(nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris (trifluoromethanesulfonyl)methide,
lithium bis(oxalato)borate,
lithium difluoro(oxalato)borate,
$Li_2B_{12}F_{12-x}H_x$ where x is equal to 0 to 8, and
a mixture of lithium fluoride and an anion receptor.

18. The lithium ion battery of claim 17 wherein the electrolyte salt comprises lithium hexafluorophosphate.

19. The lithium ion battery of claim 1 wherein the anode comprises lithium titanate or graphite as active material.

20. An electronically powered or assisted device comprising a lithium ion battery according to claim 1.

21. A device according to claim 20 that is fabricated as a transportation device, a computer, a telecommunications device, a camera, a radio, or a power tool.

22. The lithium ion battery of claim 4, wherein the fluorinated acyclic carbonate is selected from one or more members of the group consisting of $CH_3OC(O)OCH_2CF_2H$, $CH_3OC(O)OCH_2CF_3$, and $CH_3OC(O)OCH_2CF_2CF_2H$.

23. The lithium ion battery of claim 4, wherein the nonaqueous electrolyte composition (c) further comprises a solvent mixture comprising a fluorinated acyclic carbonate and at least one co-solvent.

24. The lithium ion battery of claim 23, wherein the co-solvent comprises ethylene carbonate.

25. The lithium ion battery of claim 23, wherein the solvent mixture comprises a fluorinated acyclic carbonate at about 50% to about 80% by weight of the solvent mixture.

26. The lithium ion battery of claim 1, wherein the one or more additives comprise from about 0.1% to about 2% by weight of the nonaqueous electrolyte composition.

27. The lithium ion battery of claim 26, wherein the one or more additives comprise from about 0.5% to about 1.5% by weight of the nonaqueous electrolyte composition.

* * * * *